US012307145B2

(12) United States Patent
Hayano et al.

(10) Patent No.: US 12,307,145 B2
(45) Date of Patent: May 20, 2025

(54) OUTPUT SYSTEM FOR OUTPUTTING CONTENT ACQUIRED FROM SERVER DEVICE AND TERMINAL DEVICE FOR OUTPUTTING RECEPTION SLIP TO BE USED IN OUTPUT OF CONTENT

(71) Applicant: SHARP KABUSHIKI KAISHA, Sakai (JP)

(72) Inventors: Yasutomo Hayano, Sakai (JP); Kohichi Murakami, Sakai (JP); Yasuhiro Nakai, Sakai (JP); Masaya Ishihara, Sakai (JP); Kazuhiro Yoshimoto, Sakai (JP); Masao Saeda, Sakai (JP); Tetsuji Nishijima, Yao (JP); Kazuma Ohwaki, Yao (JP); Akira Okuyama, Yao (JP); Noriyuki Suzuki, Yao (JP)

(73) Assignee: SHARP KABUSHIKI KAISHA, Sakai (JP)

(\*) Notice: Subject to any disclaimer, the term of this patent is extended or adjusted under 35 U.S.C. 154(b) by 147 days.

(21) Appl. No.: 18/230,723

(22) Filed: Aug. 7, 2023

(65) Prior Publication Data
US 2024/0069839 A1 Feb. 29, 2024

(30) Foreign Application Priority Data
Aug. 24, 2022 (JP) .................... 2022-133323

(51) Int. Cl.
*G06F 3/12* (2006.01)

(52) U.S. Cl.
CPC .......... *G06F 3/1267* (2013.01); *G06F 3/1205* (2013.01); *G06F 3/1238* (2013.01); *G06F 3/1274* (2013.01)

(58) Field of Classification Search
None
See application file for complete search history.

(56) References Cited

U.S. PATENT DOCUMENTS

2005/0018236 A1\* 1/2005 Shirai ................... G06F 3/1284
358/1.14

FOREIGN PATENT DOCUMENTS

JP 2018-139027 A 9/2018

\* cited by examiner

*Primary Examiner* — Lennin R Rodriguezgonzalez
(74) *Attorney, Agent, or Firm* — ScienBiziP, P.C.

(57) ABSTRACT

An output system includes a terminal device, an image-forming apparatus, and a server device. The terminal device includes an acquirer that acquires content from the server device, a generator that generates job data including a setting for outputting the content based on the acquired content, a transmitter that transmits the job data to the image-forming apparatus, and a reception slip outputter that outputs a reception slip including a reception number corresponding to the generated job data. The image-forming apparatus includes a receiver that receives the job data from the terminal device, and an outputter that outputs the content after executing a job based on the job data corresponding to the reception number when the reception number is input.

12 Claims, 21 Drawing Sheets

FIG. 7A

| SETTING ITEMS | SETTING VALUES |
|---|---|
| CONTENT DATA | ji-001.tiff |
| USER NAME | gyosei |
| RECEPTION NUMBER | 05092010 |
| JOB NAME | JOB947729377293 |
| HOLD DESIGNATION | Hold Only |
| THE NUMBER OF COPIES | 1 |
| SINGLE-SIDED/DOUBLE-SIDED | DOUBLE-SIDED (LONG-SIDE BINDING) |
| PAPER DISCHARGE TRAY | TOP TRAY |
| JOB RESULT NOTIFICATION | ON |

FIG. 7B

| SEQUENTIAL NUMBER | CONTENT TRANSMISSION DATE AND TIME | FEE | STATE |
|---|---|---|---|
| 9382947729377293 | MAY 20, 2022 AT 11:10 | 300 | OUTPUT COMPLETED |
| 9382947729377294 | MAY 20, 2022 AT 11:14 | 300 | NOT YET OUTPUT |
| : | : | : | : |

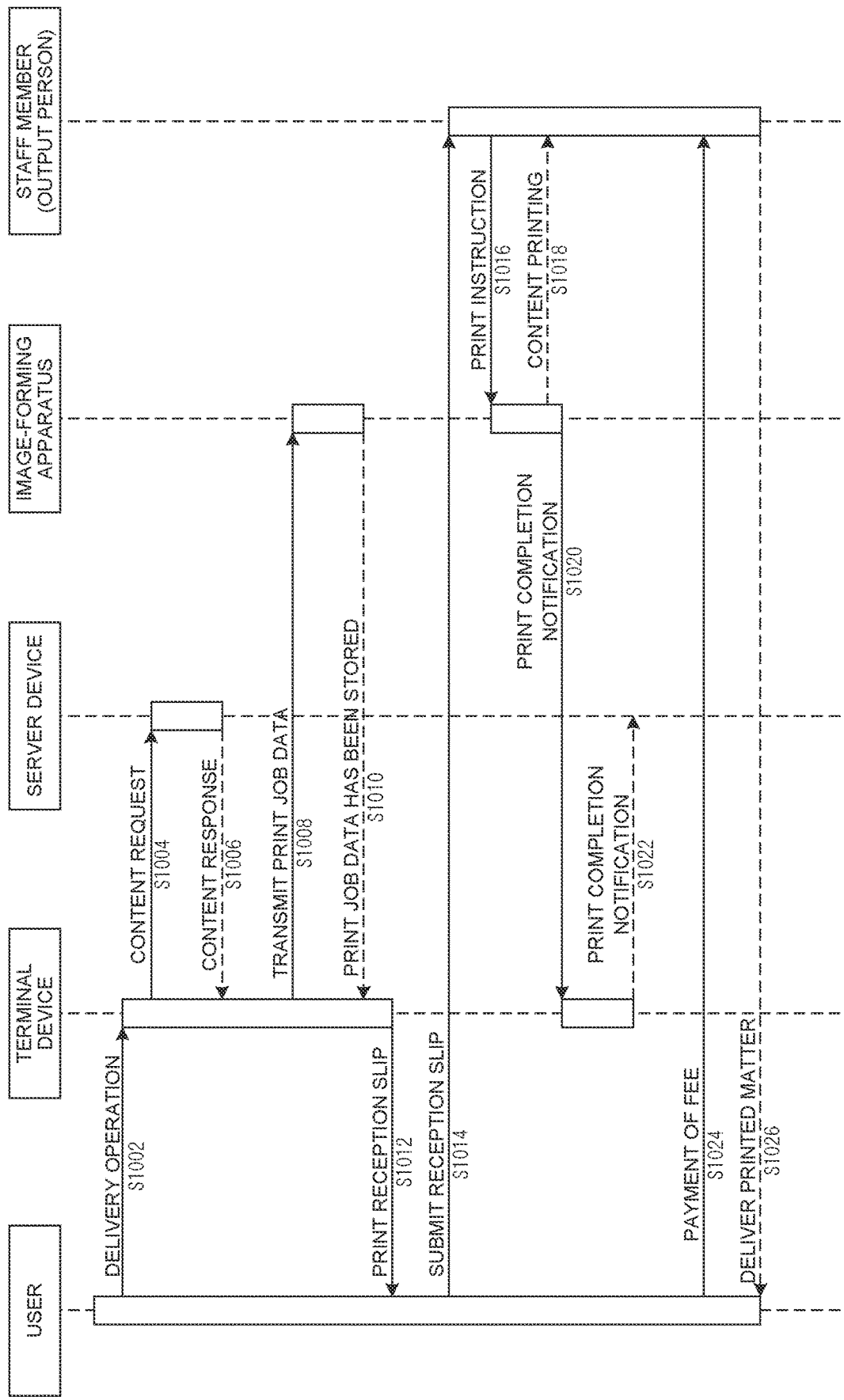

FIG. 15A

| | |
|---|---|
| TYPE | XX-CITY RESIDENCE CERTIFICATE (PARTIAL HOUSEHOLD) |
| ENTRIES | PLACE OF REGISTRY AND RELATIONSHIP |
| THE NUMBER OF COPIES | 1 |

CONFIRM THE CERTIFICATE TO BE DELIVERED — R140

END / RETURN / NEXT

FIG. 15B

INPUT PIN — R150

****

| 1 | 2 | 3 |
|---|---|---|
| 4 | 5 | 6 |
| 7 | 8 | 9 |
| ← | 0 | DELETE |

END / RETURN / NEXT

FIG. 18

RECEPTION SLIP

RECEPTION NUMBER :
05092010

<NOTIFICATION>
BRING THIS RECEPTION SLIP TO THE
WINDOW.

IDENTIFICATION WITH MY NUMBER
CARD
AFTER PAYING THE CERTIFICATE FEE,
YOU WILL RECEIVE YOUR CERTIFICATE.

TOTAL  300  YEN (TAX EXEMPTION)

1 COPY (2 IN TOTAL)

DATE OF ISSUE:
MAY 20, 2022 AT 11:10

SEQUENTIAL NUMBER : 9382947729377293

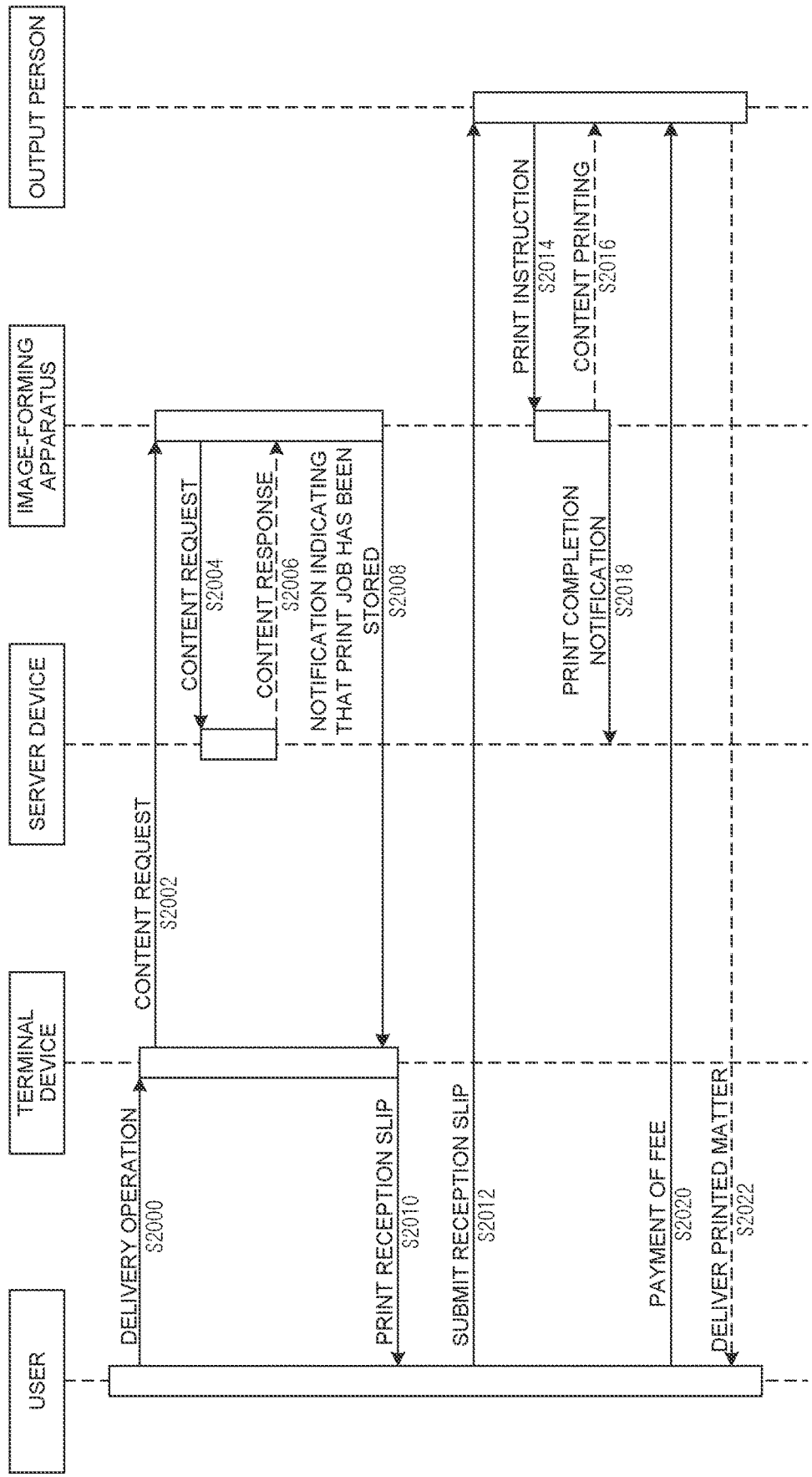

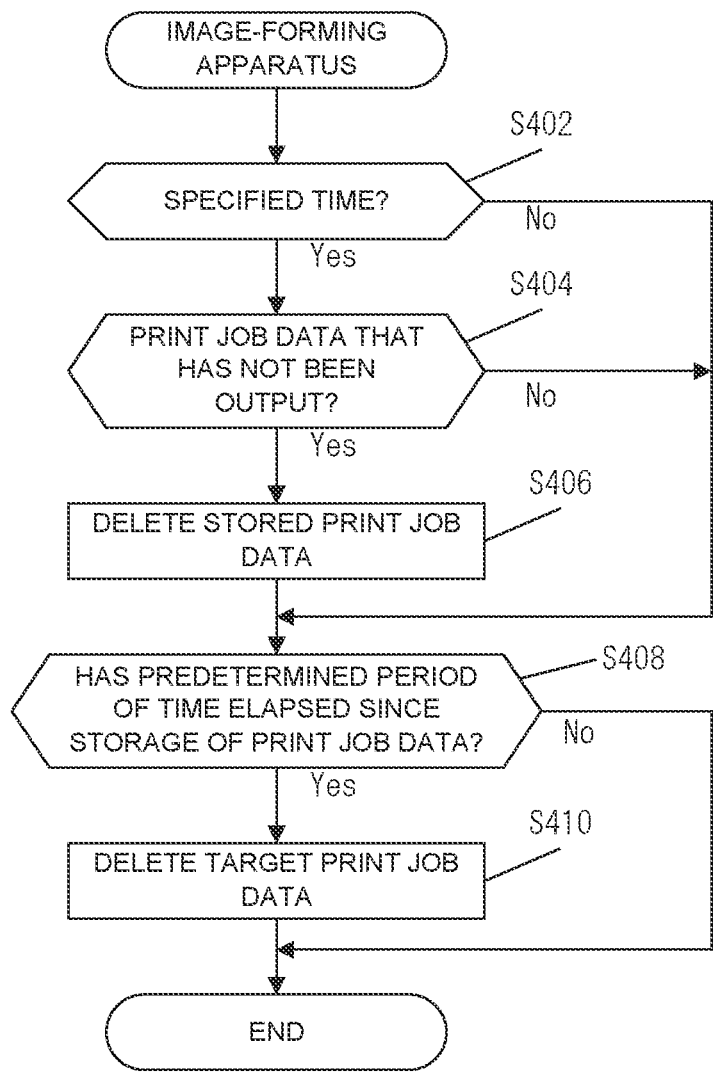

OUTPUT SYSTEM FOR OUTPUTTING CONTENT ACQUIRED FROM SERVER DEVICE AND TERMINAL DEVICE FOR OUTPUTTING RECEPTION SLIP TO BE USED IN OUTPUT OF CONTENT

BACKGROUND OF THE INVENTION

Field of the Invention

The present disclosure relates to an output system and the like.

Description of the Background Art

Systems that output documents of various types of content have been used. Examples of such a system include a system that outputs a certificate, such as a residence certificate and a seal signature, as a single type of content in an administrative service.

In such a system, an efficient content output system is being considered. For example, a technique of reducing a burden of procedures at counters of government offices for both residents and staff, reducing time spent at the counters, and improving overall efficiency has been known.

The present disclosure provides a system capable of efficiently outputting content, for example.

SUMMARY OF THE INVENTION

According to an aspect of the present disclosure, an output system includes a terminal device, an image-forming apparatus, and a server device. The terminal device includes an acquirer that acquires content from the server device, a generator that generates job data including a setting for outputting the content based on the acquired content, a transmitter that transmits the job data to the image-forming apparatus, and a reception slip outputter that outputs a reception slip including a reception number corresponding to the generated job data. The image-forming apparatus includes a receiver that receives the job data from the terminal device, and an outputter that outputs the content after executing a job based on the job data corresponding to the reception number when the reception number is input.

According to another aspect of the present disclosure, a terminal device capable of communicating with an image-forming apparatus and a server device includes an acquirer that acquires content from the server device through a secure first communication path, a generator that generates job data including a setting for outputting the content based on the acquired content, a transmitter that transmits the job data to the image-forming apparatus through a second communication path that is different from the first communication path, and a reception slip outputter that generates a reception number that corresponds to the job data and that is to be used when the image-forming apparatus outputs the content and that outputs a reception slip including the reception number.

According to the present disclosure, a system capable of efficiently outputting content, for example, may be provided.

BRIEF DESCRIPTION OF THE DRAWINGS

FIG. 7A is a diagram illustrating an example of print job data according to the first embodiment, and FIG. 7B is a diagram illustrating an example of content management information according to the first embodiment.

FIG. 8 is a sequence diagram illustrating an outline of the first embodiment.

FIG. 15A is a diagram illustrating an example of a display screen of the terminal device according to the first embodiment, and FIG. 15B is a diagram illustrating an example of a display screen of the terminal device according to the first embodiment.

FIG. 18 is a diagram illustrating an example of a reception slip according to the first embodiment.

FIG. 20 is a sequence diagram illustrating an outline of a second embodiment.

FIG. 21 is a flowchart of a process (of an image-forming apparatus) according to a third embodiment.

DESCRIPTION OF THE PREFERRED EMBODIMENTS

Embodiments for implementing the present disclosure will be described below with reference to the accompanying drawings. Note that the embodiments below are merely examples of the present disclosure, and content of the present disclosure is not to be construed as being limited based on the following description.

Systems that output various types of content (documents) have been used. Examples of such a system include a system that outputs a certificate, such as a residence certificate or a seal signature, as a single type of content in the administrative service. Generally, a system of administrative services often issues certificates via a counter, but in order to make it easier for users (citizens) and more efficient for the administrative service to issue certificates, many self-service administrative service machines have been introduced.

However, self-service administrative service machines are required to be dedicated machines, and required to be newly installed. Therefore, there arises a problem in that self-service administrative service machines are unprofitable when the number of users is less than a certain number and difficult to be installed.

Even when a self-service administrative service machine is introduced, the machine may not be used for general office works because the machine is a dedicated machine.

In order to solve these problems, the following embodiments describe simple and efficient systems for outputting content by combining an image-forming apparatus (a multifunction peripheral or an MFP) that is usable for general operations and a terminal device for reception.

1. First Embodiment 1.1 Entire System

Figure 1:
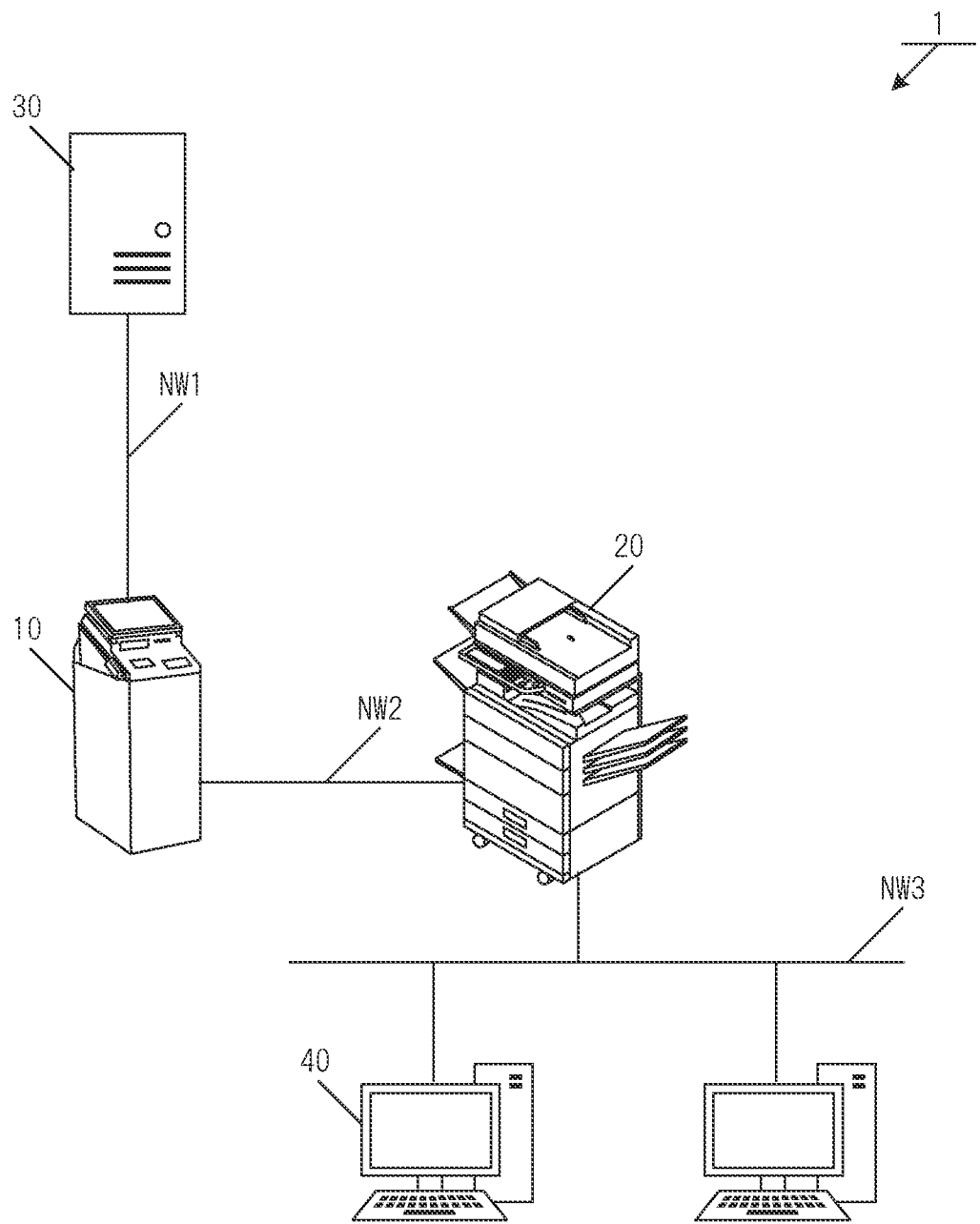
FIG. 1 is a diagram illustrating an outline of a system according to a first embodiment.

FIG. 1 is a diagram illustrating an outline of a system 1. The system 1 that outputs content is schematically illustrated.

The system 1 includes a terminal device 10 capable of accepting content output instructions from users, an image-forming apparatus 20 that outputs (prints) content, and a server device 30 that stores content. The image-forming apparatus 20 is connected not only to the terminal device 10, but also to a PC 40, which is a general information processing device (a computer).

The image-forming apparatus 20 is referred to as a multifunction peripheral/printer/product (MFP), for example. For example, when executing a job (a print job), the image-forming apparatus 20 may form an image on a sheet, that is, a recording medium. The image-forming apparatus 20 is capable of executing a plurality of functions including a copy function, a FAX function, a scan function, and a printer function. In this embodiment, the image-forming apparatus 20 functions as a printer by executing a print job supplied from the PC 40. Furthermore, the image-forming apparatus 20 is capable of outputting (printing) content by executing a print job supplied by the terminal device 10, as described below.

The terminal device 10 is a processing device used by the user of the service 1. The terminal device 10, for example, has a display device (a display) with a touch panel. The user can input a desired operation to the system 1 by selecting an operation button or the like displayed on the screen.

Furthermore, the terminal device 10 includes a print device. For example, the terminal device 10 can print a reception slip, a copy, or the like indicating that the system 1 has received an instruction input by the user. The terminal device 10 may include a roll of thermal transfer paper, for example, and the print device may perform printing on the thermal transfer paper using a thermal transfer method to print a so-called receipt-like reception slip. Furthermore, the print device may be realized by, for example, a laser printer, an inkjet printer, or the like, and in this case, the reception slip or the like may be printed on plain paper.

Furthermore, the terminal device 10 may include a card reader. The terminal device 10 may, for example, use Near Field Communication (NFC) to obtain information from a card (a credit card, a transportation card, a membership card, a My Number Card, etc.). Alternatively, the terminal device 10 may use an optical reader to obtain information by reading an identification code, such as a two-dimensional code.

The terminal device 10 is connected to the image-forming apparatus 20 via a network NW2. The image-forming apparatus 20 is connected to the terminal device 10 through the network NW2, and is connected to other devices (the PC 40) through a network NW3.

Here, the network NW2 is a general network and is constituted by a local area network (LAN), for example. The network NW2 may be a wired or wireless network, and may be connected using, for example, a mobile communication network. Furthermore, the network NW2 and the network NW3 may be the same network.

The terminal device 10 is connected to the server device 30 via a network NW1. The network NW1 is a dedicated line and a secure communication path (a network) in a closed area. Note that the network NW1 is at least a secure network and is preferably a dedicated line, but the network NW1 may be a virtual communication path (a dedicated line) by configuring a virtual private network (VPN), for example.

The server device 30 provides content. Here, in this embodiment, a case where the system 1 is applied to administrative services is described as an example. For example, the server device 30 is installed by a so-called administrative service (a local government). For example, the server device 30 stores information managed by the existing resident registry system and information required for certificate delivery as content.

Configuration of Server Device

Here, the server device 30 is a device or a service that provides content. Although the system 1 in FIG. 1 is simplified and the server device 30 is illustrated as a single device, the server device 30 may be a service including a plurality of server devices that provides content. Furthermore, content may be provided using a distributed model, such as a blockchain.

In this embodiment, as an example of the system 1 using the server device 30, a system used when a local government delivers certificates will be described.

Figure 2:
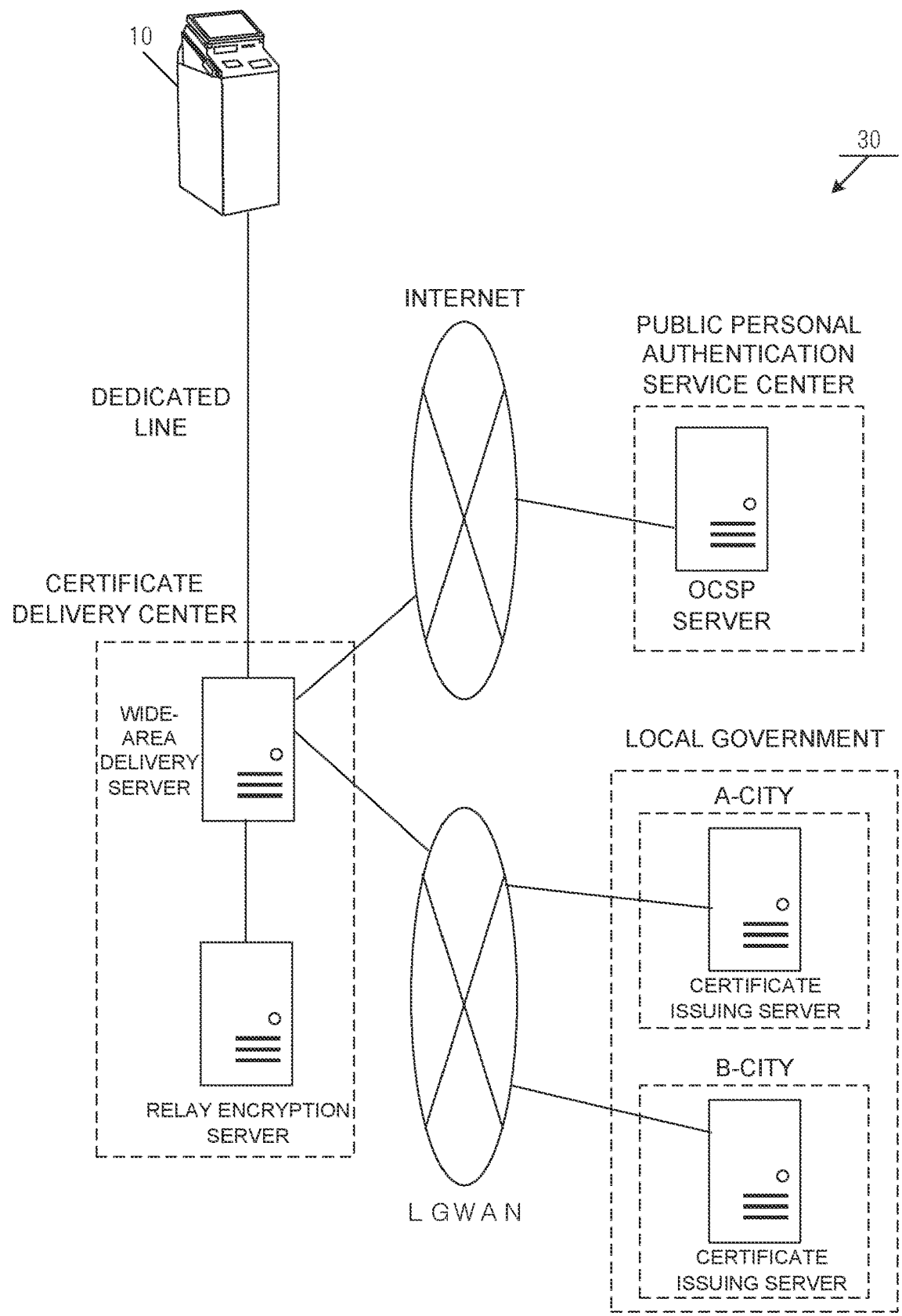
FIG. 2 is a diagram illustrating the outline of the system according to a first embodiment.

For example, the server device 30 is a system that delivers certificates based on general administrative services as shown in FIG. 2.

For example, local governments individually install certificate issuing servers (certificate issuing servers). The certificate issuing server then uses a certificate delivery center to provide information for enabling delivery of certificates to the terminal device 10.

In the certificate delivery center, for example, a wide-area delivery server relays a communication between the terminal device 10 and the certificate issuing server. Furthermore, the certificate delivery center may include a relay encryption server to prevent forgery or tampering with data to be used for a certificate.

Furthermore, the certificate delivery center may manage statistical information on the number of certificates delivered, locations of delivery, and so on.

Here, as a network between the certificate delivery center and the terminal device 10, a dedicated line that is closed to exclude access from third parties is used. As a network between the certificate delivery center and the local governments, a local government wide area network (LGWAN), which is a network closed within administrative organs, may be used.

Furthermore, a public personal authentication service center may be used to perform personal authentication of the user. For example, in the case of the JPKI authentication method, the certificate delivery center system inquires an OCSP server (an OCSP responder) of the public personal authentication service center (JPKI Center) to confirm revocation of an electronic certificate for user certificate stored in a My Number Card. The OCSP server (the OCSP responder) returns a revocation confirmation result to the certificate delivery center system.

Thus, although the server device 30 is described as the certificate issuing service in this embodiment, the certificate issuing service may include a plurality of server devices or a plurality of services. Note that, as an overview of such services, for example, the mechanisms disclosed in the Organization for Local Government Information Systems (https://www.j-lis.go.jp/rdd/card/convinikoufu/cms_93097920214.html, and https://www.j-lis.gajp/rdd/card/convinikoufu/cms_93099520.html), etc. may be used.

1.2 Hardware Configuration

Figure 3:
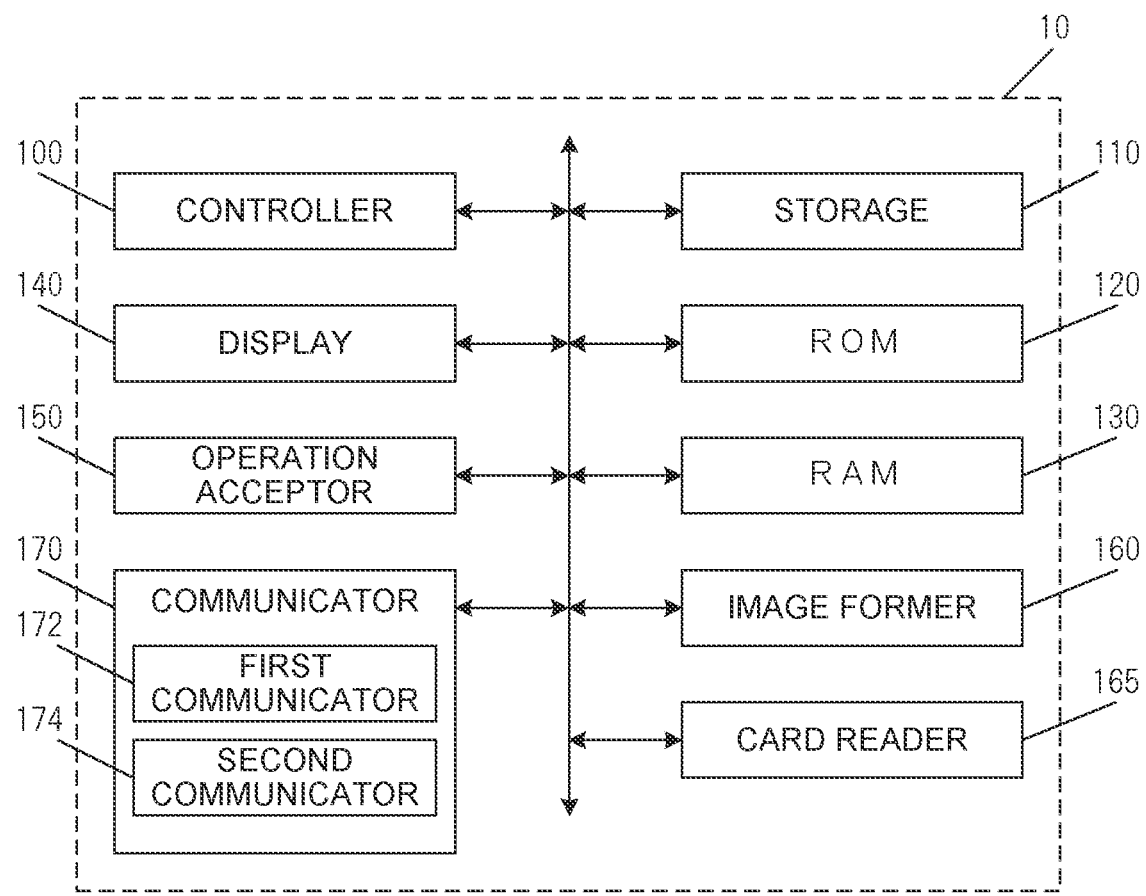
FIG. 3 is a diagram illustrating a configuration of hardware of a terminal device according to the first embodiment.
Figure 4:
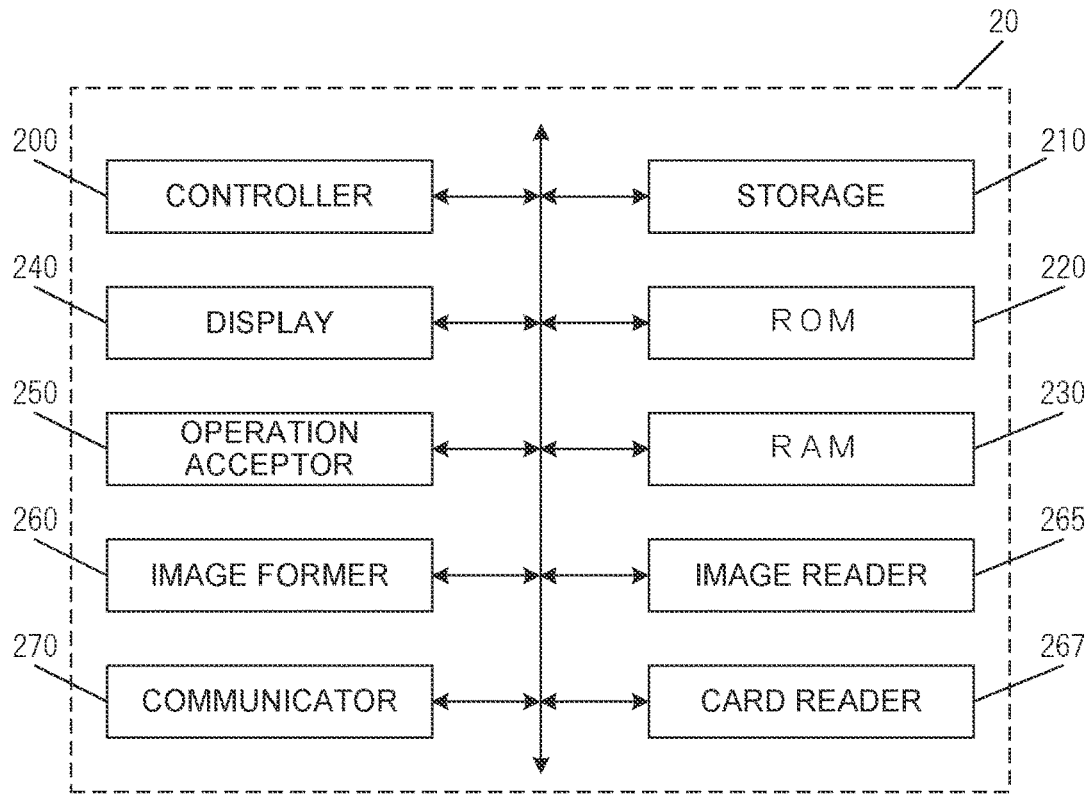
FIG. 4 is a diagram illustrating a configuration of hardware of an image-forming apparatus according to the first embodiment.
Figure 5:
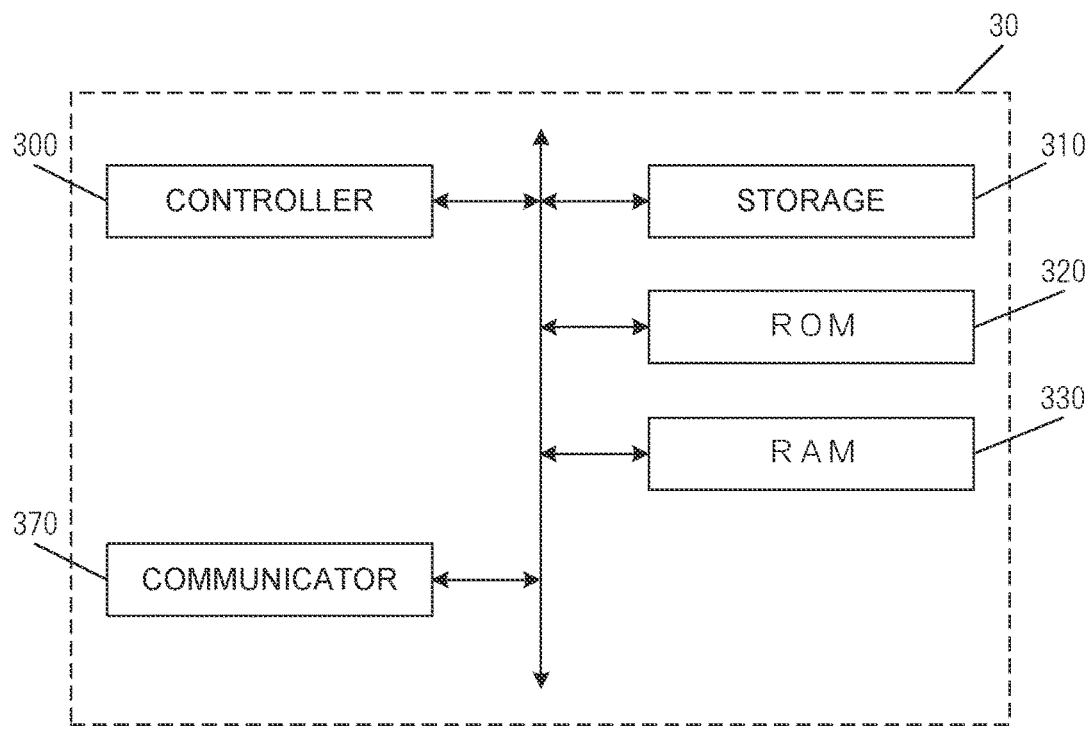
FIG. 5 is a diagram illustrating a configuration of hardware of a server device according to the first embodiment.

Hardware configurations of the individual devices will be described below with reference to the drawings. FIGS. 3, 4, and 5 are diagrams illustrating examples of hardware configurations of the terminal device 10, the image-forming apparatus 20, and the server device 30, respectively.

1.2.1 Terminal Device

As illustrated in FIG. 3, the terminal device 10 includes a controller 100, a storage 110, a ROM 120, and a RAM 130 that serve as storage devices, a display 140, an operation acceptor 150, an image former 160, a card reader 165, and a communicator 170.

The controller 100 is a functional portion that controls the entire terminal device 10. The controller 100 realizes various functions by reading and executing various programs stored in the storage 110 and the ROM 120 and may be realized by at least one control device/arithmetic device (a Central Processing Unit (CPU) or System on a Chip (SoC)).

The storage 110 is a non-volatile storage device capable of storing programs and data. For example, the storage 110 may be configured by a storage device, such as a Hard Disk Drive (HDD) or a Solid State Drive (SSD). Alternatively, the storage 110 may be configured by a USB memory connectable to an outside, a compact disc (CD)-ROM drive, or a Blu-ray disc (BD)-drive. Furthermore, the storage 110 may be, for example, a storage region on a cloud.

The ROM 120 is a non-volatile memory capable of retaining programs and data even when the power is turned off.

The RAM 130 is a main memory mainly used when the controller 100 executes processing. The RAM 130 is a rewritable memory that temporarily stores programs read from the storage 110 or the ROM 120 and data including results of execution.

The display 140 is a display device capable of displaying various pieces of information and execution screens. The display 140 may be, for example, a display device, such as a liquid crystal display (LCD), an organic electro luminescence (EL) display, or an electrophoretic display. Furthermore, the display 140 includes an interface to which a display device is connectable. For example, the display 140 may be configured by an external display device connected via High-Definition Multimedia Interface (HDMI) (registered trademark), Digital Visual Interface (DVI), or Display Port.

The operation acceptor 150 is an operation device that allows a user to input an operation. For example, the operation acceptor 150 may be an operation device, such as a touch panel integrated with the display 140 or an operation button. Furthermore, the operation acceptor 150 may be an operation device, such as a keyboard or a mouse. Moreover, the operation acceptor 150 may include an interface (e.g., Universal Serial Bus (USB)) to which an operation device is connectable. For example, the terminal device 10 may be connected to a different operation device (an operation device with a touch panel).

The image former 160 forms an image, for example, on a recording sheet. The image former 160 may be configured as a thermal printer (a thermal transfer printer) that forms images on a thermal sheet, for example, and may be configured as an image-forming apparatus, such as a printer. Furthermore, the image former 160 may electronically form an image as an image file.

The card reader 165 is a device that reads, for example, information for identifying personal information from various cards. For example, the card reader 165 can read an electronic certificate for user certificate stored in a My Number Card. Furthermore, the card reader 165 may read IC cards (such as NFC) or magnetic data. Alternatively, the card reader 165 may be a device that optically reads 2D codes (e.g., a bar code reader).

The communicator 170 is a communication interface that communicates with other devices. For example, the communicator 170 may be a network interface capable of providing wired connection or wireless connection. In this embodiment, communication with other devices is available via the network NW.

In this embodiment, the communicator 170 includes a first communicator 172 that communicates with the image-forming apparatus 20 and a second communicator 174 that communicates with the server device 30. Here, the second communicator 174 is preferably configured by a dedicated line.

Note that, although a case where the first communicator 172, in which a communication path for communication with the image-forming apparatus 20 is established, and the second communicator 174, in which a communication path for communication with the server device 30 is established, are physically different from each other is described as an example in this embodiment, the paths may be separated in terms of software. For example, the second communicator 174 at least has established secure communication with the server device 30 by means of a VPN line.

Specifically, the first communicator 172 communicates with another device (in this embodiment, the image-forming apparatus 20), and the second communicator 174 is used to establish secure communication with the server device 30.

1.2.2 Image-Forming Apparatus

As illustrated in FIG. 4, the image-forming apparatus 20 includes a controller 200, a storage 210, a ROM 220, and a RAM 230 that serve as storage devices, a display 240, an operation acceptor 250, an image former 260, an image reader 265, and a communicator 270.

The controller 200 is a functional unit for controlling the entire image-forming apparatus 20. The controller 200 realizes various functions by reading and executing various programs stored in the storage 210 and the ROM 220 and is realized by at least one control device/arithmetic device (a Central Processing Unit (CPU) or System on a Chip (SoC)).

The storage 210 is a non-volatile storage device capable of storing programs and data. For example, the storage 210 may be configured by a storage device, such as a Hard Disk Drive (HDD) or a Solid State Drive (SSD). Alternatively, the storage 210 may be configured as an externally connectable USB memory. Furthermore, the storage 210 may be, for example, a storage region on a cloud.

The ROM 220 is a non-volatile memory capable of retaining programs and data even when the power is turned off.

The RAM 230 is a main memory mainly used when the controller 200 executes processing. The RAM 230 is a rewritable memory that temporarily stores programs read from the storage 210 or the ROM 220 and data including results of execution.

The display 240 is a display device capable of displaying various pieces of information and execution screens. The display 240 may be, for example, a display device, such as a liquid crystal display (LCD), an organic electro luminescence (EL) display, or an electrophoretic display. Furthermore, the display 240 includes an interface to which a display device can be connected. For example, the display 240 may be configured by an external display device connected via High-Definition Multimedia Interface (HDMI) (registered trademark), Digital Visual Interface (DVI), or Display Port.

The operation acceptor 250 is an operation device that allows a user to input an operation. For example, the operation acceptor 250 may be an operation device, such as a touch panel integrated with the display 240 or an operation button. Furthermore, the operation acceptor 250 may be an operation device, such as a keyboard or a mouse. Moreover, the operation acceptor 250 may include an interface (e.g., Universal Serial Bus (USB)) to which an operation device is connectable. For example, the image-forming apparatus 20 may be connected to a different operation device (an operation device with a touch panel).

The image former 260 forms an image, for example, on a recording sheet. The image former 260, for example, includes an image carrier, forms a toner image on the image carrier, and transfers the image on the image carrier onto the recording paper, thereby forming an image. The image former 260 may be configured as an image-forming apparatus, such as a printer. Furthermore, the image former 260 may electronically form an image as an image file.

The image reader 265 reads a document (an image) to be output as image data. The image reader 265 is, for example, a scanner, and may be a reading device using a Charge Coupled Device (CCD) or Contact Image Sensor (CIS).

The card reader 267 is a device that reads, for example, information for identifying personal information from various cards. For example, the card reader 267 can read personal identification information stored in an identification card. Furthermore, the card reader 267 may read IC cards (such as NFC) or time data. Alternatively, the card reader 165 may be a device that optically reads 2D codes (e.g., a bar code reader).

The communicator 270 is a communication interface that communicates with other devices. For example, the communicator 270 may be a network interface capable of providing wired connection or wireless connection. In this embodiment, communication with other devices is available via the network NW.

1.2.3 Server Device

As illustrated in FIG. 5, the server device 30 includes a controller 300, a storage 310, a ROM 320, and a RAM 330 that serve as storage devices, and a communicator 370.

Note that, although a single server device is described in this embodiment as described above, the functions and the data may be distributed in the required server devices as needed.

The controller 300 is a functional unit that controls the entire server device 30. The controller 300 realizes various functions by reading and executing various programs stored in the storage 310 and the ROM 320 and is realized by at least one control device/arithmetic device (a Central Processing Unit (CPU) or System on a Chip (SoC)).

The storage 310 is a non-volatile storage device capable of storing programs and data. For example, the storage 310 may be configured by a storage device, such as a Hard Disk Drive (HDD) or a Solid State Drive (SSD). Furthermore, the storage 310 may be configured by a USB memory connectable to an outside, a CD-ROM drive, or a BD drive. Furthermore, the storage 310 may be, for example, a storage region on a cloud.

The ROM 320 is a non-volatile memory capable of retaining programs and data even when the power is turned off.

The RAM 330 is a main memory mainly used when the controller 300 executes processing. The RAM 330 is a rewritable memory that temporarily stores programs read from the storage 310 or the ROM 320 and data including results of execution.

The communicator 370 is a communication interface that communicates with other devices. For example, the communicator 370 may be a network interface capable of providing wired connection or wireless connection. In this embodiment, connection to the terminal device 10 is available via a dedicated line.

Furthermore, in addition to the configuration illustrated in FIG. 5, the server device 30 may further include other components, such as a display and an operation acceptor. Alternatively, a display device and an operation device may be connected to the server device 30 so that the server device 30 realizes the same functions as a display or an operation acceptor. Furthermore, the server device 30 may provide a user interface for operating and managing other devices, as described below.

1.3 Software Configuration

Figure 6:
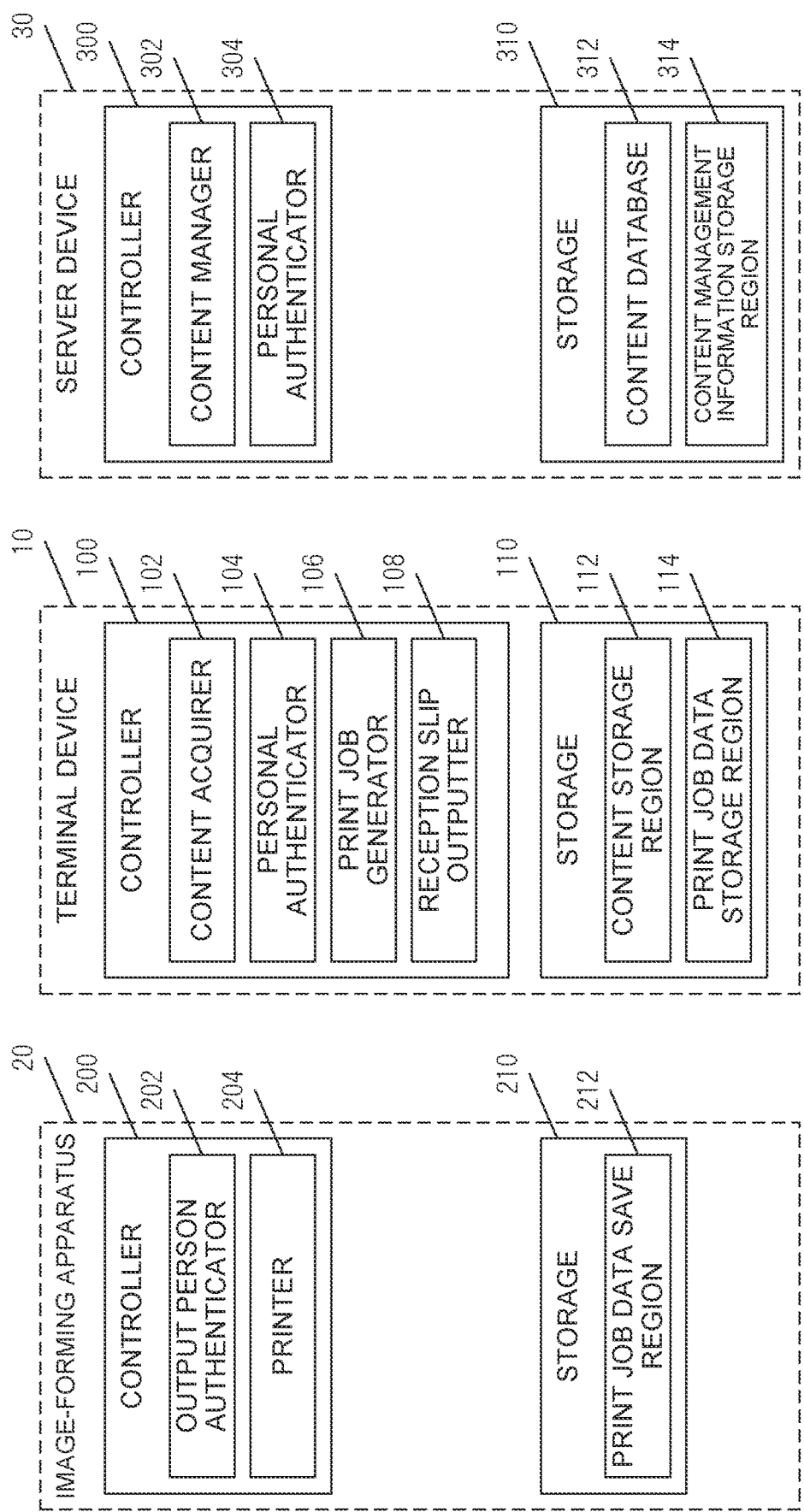
FIG. 6 is a diagram illustrating a configuration of software according to the first embodiment.

Software configurations will be described with reference to FIG. 6. FIG. 6 is a diagram illustrating main software configurations of the terminal device 10, the image-forming apparatus 20, and the server device 30.

Terminal Device

The controller 100 of the terminal device 10 functions as the following components by executing the programs (applications) stored in the storage 110 or the ROM 120.

A content acquirer 102 acquires content from the server device 30. The content acquirer 102 stores acquired content in a content storage region 112. Here, the content stored in the content storage region 112 may be deleted after a prescribed process is executed. For example, when content-based print job data is generated, the controller 100 deletes the content included in print job data from the content storage region 112. Furthermore, the controller 100 may delete content stored for a predetermined period of time.

The content acquired by the content acquirer 102 relates to, for example, certificates issued by an administrative service, that is, a local government, in this embodiment. For example, when the server device 30 is installed by a local government, certificates include a copy of a residence certificate, a certificate of entry in a residence certificate, a certificate of a seal impression, a family registration certificate, and a tax certificate. Furthermore, in addition to local governments, certificates may be issued by other governments, for example, a certified copy of the corporate register (a certificate of all historical matters and a certificate of registered matters), a vehicle inspection certificate, or a fixed asset valuation certificate.

A personal authenticator 104 authenticates a user. The personal authenticator 104 obtains, for example, an electronic certificate stored in a My Number Card via the card reader 165. The personal authenticator 104 then confirms the identity of the user by using the electronic certificate and a password input by the user to contact the national certificate authority (e.g., J-LIS). Here, when the user can be authenticated, for example, a certificate about the user can be issued as content. When the user cannot be authenticated, the content may not be obtained. Specifically, the user may not receive a certificate as content, for example.

Here, the authentication of a user refers to whether a user who is performing the procedure is a person himself/herself. For example, when the user is authenticated by performing personal authentication using a My Number Card, the user who is performing the procedure can be confirmed to be the person described in the My Number Card. Furthermore, the personal authenticator 104 includes a method for confirming whether the electronic certificate is valid as a method for authenticating the user. When the electronic certificate is not valid, the personal authenticator 104 may not authenticate the user in the first place. The personal authenticator 104 can also use the electronic certificate and a password to authenticate the validity. When the password corresponding to the electronic certificate matches, the personal authenticator 104 determines that the user has been authenticated.

Note that the personal authenticator 104 may use other mechanisms that can authenticate individuals, for example. For example, authentication using user information obtained from a cell phone company, authentication via another site, authentication using a card that can identify individual, biometric authentication, or the like may be used.

A print job generator 106 generates print job data to be transmitted to the image-forming apparatus 20. The print job data includes data indicating content (e.g., image data) and setting information that includes print settings and other information. The print job generator 106 stores print job data relating to the generated print job in a print job data storage region 114.

The print job generator 106, for example, adds a PJL (Printer Job Language) header to the content (a multi-TIFF file as an image file) obtained from the server device 30 (J-LIS service).

The print job data generated by the print job generator 106 includes information illustrated in FIG. 7A, for example. For example, the print job data shown in FIG. 7A is stored with setting information associated with the content data (e.g., "ji-001.tiff").

The setting information includes a name of a user who can output the content (e.g., "gyosei"), a reception number (e.g., "05092010"), a job name (e.g., "JOB9477293777293"), a hold designation (e.g., "Hold Only"), the number of copies (e.g., "1"), a single-sided/double-sided output setting (e.g., "Double-sided (long-side binding)"), a paper discharge tray (e.g., "Top Tray"), and a job result notification (e.g., "ON").

The reception number is a type of password that is added to the content. For example, an output person who outputs the content uses the reception number so as to identify and output the content.

The job name is a name by which the image-forming apparatus 20 identifies a print job. The job name may be any name, or a number corresponding to the content may be added. For example, the job name may be a number utilizing a number added by the server device 30 to the content (e.g., a query number), or may be a number itself added by the server device 30.

The hold designation determines whether a print job is to be immediately executed by the image-forming apparatus 20 or temporarily stored and then executed by the image-forming apparatus 20 upon an operation performed by the output person. For example, when the hold designation is set, the image-forming apparatus 20 does not immediately execute the print job, but executes the print job after an operation is performed by the output person.

Note that, in FIG. 7A, "Hold Only" is set, and the print job is required to be temporarily stored. In this embodiment, it is preferable that the hold designation is always set for a print job based on content obtained from the server device 30.

The number of copies, the single-sided/double-sided setting, the paper discharge tray, etc., are information that indicates print conditions when the image-forming apparatus 20 prints the content. In addition to this, the print job generator 106 may also set other print conditions, such as whether stapling is performed, discrimination between color printing and black-and-white printing, a paper size, and a paper feeding tray.

Note that it is preferable that the print conditions for printing content in this embodiment are set by the print job generator 106 and may not be changed by the image-forming apparatus 20. For example, the number of copies set by the print job generator 106 may not be changed by the image-forming apparatus 20. Specifically, it is preferable that the number of copies set by the user using the terminal device 10 may not be changed by the output person using the image-forming apparatus 20 without permission.

The job result notification is information indicating whether the image-forming apparatus 20 notifies the terminal device 10 of a result of execution of a print job. As a job result, for example, the image-forming apparatus 20 can notify that the print job has been stored, that the print job has been executed, that the print job has been deleted, that the print job has been aborted, that the print job is in an error state, etc.

A reception slip outputter 108 outputs (prints) a reception slip from the image former 160. Although the details of the reception slip are described below, a reception slip printed with the reception number, for example, is output to the user. The user then submits the reception slip to the output person who outputs the content. The output person outputs the content based on the reception number printed on the reception slip.

Image-Forming Apparatus

The controller 200 of the image-forming apparatus 20 functions as the following components by executing the programs (applications) stored in the storage 210 or the ROM 220.

The output person authenticator 202 authenticates the output person and confirms whether the output person has an authority to output content. For example, the output person authenticator 202 performs card authentication using a card of the output person to determine whether the person is authorized.

The printer 204 forms an image using the image former 260 based on print job data. Here, the printer 204 may immediately start printing when a print job is submitted. When a print job is submitted, the printer 204 may temporarily store (hold) the print job data for the print job and perform printing based on an instruction. As storage of the print job data, the printer 204 stores the print job data in the print job data save region 212. Specifically, the print job data save region 212 functions as a storage for storing print job data.

Furthermore, when printing content (image data) included in print job data, the printer 204 refers to print settings. The print settings may be set in the image-forming apparatus 20 or included in the print job data. The printer 204 extracts the print settings included in the print job data and prints the content (image data) in accordance with the extracted print settings.

Server Device

The controller 300 of the server device 30 functions as the following components by executing the programs (applications) stored in the storage 310 or the ROM 320.

A content manager 302 realizes a function of managing content, and transmits content to the terminal device 10 in response to a request from the terminal device 10, for example. The content manager 302 extracts required content (a certificate) from a content database 312 based on application information transmitted from the terminal device 10. The content manager 302 then transmits the extracted content (image data) to the terminal device 10.

Furthermore, the content manager 302 may manage whether content has actually been output to the user. For example, the content manager 302 updates content management information stored in a content management information storage region 314 based on a print completion notification transmitted from the image-forming apparatus 20 when the content is actually printed by the image-forming apparatus 20.

FIG. 7B is a diagram illustrating an example of the content management information. The content management information stores, for example, a sequential number of a certificate delivered as content (an inquiry number), a date and time when the content is transmitted to the image-forming apparatus 20, a fee charged for such delivery, and a print state of the content. Furthermore, the content management information may include other information, such as a region or a location where the content is printed.

The print state of the content is "output completed" when the content is actually printed by the image-forming apparatus 20. Note that the print job data based on the content may be represented as "output completed" at a timing when the image-forming apparatus 20 stores the print job data.

Note that the content may be managed by the certificate delivery center, for example, when the certificate relates to the administrative services.

A personal authenticator 304 performs user authentication. The personal authenticator 304 is almost identical to the personal authenticator 104 of the terminal device 10, and only one of the personal authenticators 304 and 104 may function. The personal authenticator 304 may perform personal identification as needed.

1.4 Flow of Processing

A flow of processing of this embodiment will now be described. Although it is preferable that each of the components described in FIG. 6 perform the following processes where appropriate, for the sake of explanation, it is assumed that the controller executes the processes in the following description.

1.4.1 Entire Processing Flow

First, an entire processing flow of the system 1 will be described with reference to FIG. 8. For example, a citizen (a user) who desires to receive a certificate performs a delivery operation on the terminal device 10 (S1002). The terminal device 10 requests content corresponding to the certificate from the server device 30 based on details entered by the delivery operation (S1004). When the user is appropriately authenticated (when the user's validity is proved), the server device 30 transmits the content corresponding to the certificate desired by the user to the terminal device 10 as a content response (S1006).

The terminal device 10 generates print job data including setting information based on the acquired content, and transmits the print job data to the image-forming apparatus 20 (S1008). Then, the image-forming apparatus 20 stores the print job data and notifies the terminal device 10 that the print job data has been stored (S1010). When confirming that the print job data has been stored in the image-forming apparatus 20, the terminal device 10 prints a reception slip for the user (S1012).

Here, it is preferable that the terminal device 10 prints the reception slip after receiving a notification indicating that the print job data has been stored from the image-forming apparatus 20. In this case, the fact that the reception slip has been printed corresponds to a state in which the content is printable by the image-forming apparatus 20. Therefore, after this operation, when the user submits the reception slip (S1014) to the output person (e.g., a staff member who outputs the content), the output person can promptly output the content. Furthermore, a period of time in which the user waits for output of the content may be reduced. Moreover, it is recognized that the print job data is stored in the image-forming apparatus 20 because the reception slip is printed, and therefore, a situation that the print job data is not stored since an error has occurred during the process may be avoided.

Furthermore, the terminal device 10 may output the reception slip before receiving the notification indicating that the print job data has been stored. Although the user may be required to wait for the print job data to be stored in some cases, the user can promptly receive the reception slip.

When the staff member who delivers the certificate serving as content (the output person who outputs the content) receives submission of the reception slip from the user, the output person may, for example, verify the identity of the user. For example, the identity of the user (a person with valid authority) may be confirmed by viewing a document that can identify the individual, such as a My Number Card or a driver's license.

The staff member (the output person) issues a print instruction to the image-forming apparatus 20 (S1016). The image-forming apparatus 20 executes a print job so as to print the content based on the print job data (S1018).

When the printing is completed, the image-forming apparatus 20 transmits a print completion notification to the terminal device 10 (S1020). The terminal device 10 transmits the print completion notification to the server device 30 (S1022).

When the user pays a fee to the output person, for example (S1024), the output person delivers the printed certificate to the user (S1026). Accordingly, the user can receive the certificate of the authenticated identity.

Furthermore, the image-forming apparatus 20 may receive a print job from devices other than the terminal device 10. In other words, the image-forming apparatus 20 may not only deliver the certificate but also print general documents. Accordingly, the image-forming apparatus 20 can perform a function of printing certificates, which originally require a dedicated line, via the terminal device 10, in addition to normal functions.

1.4.2 Processing of Terminal Device

Figure 9:
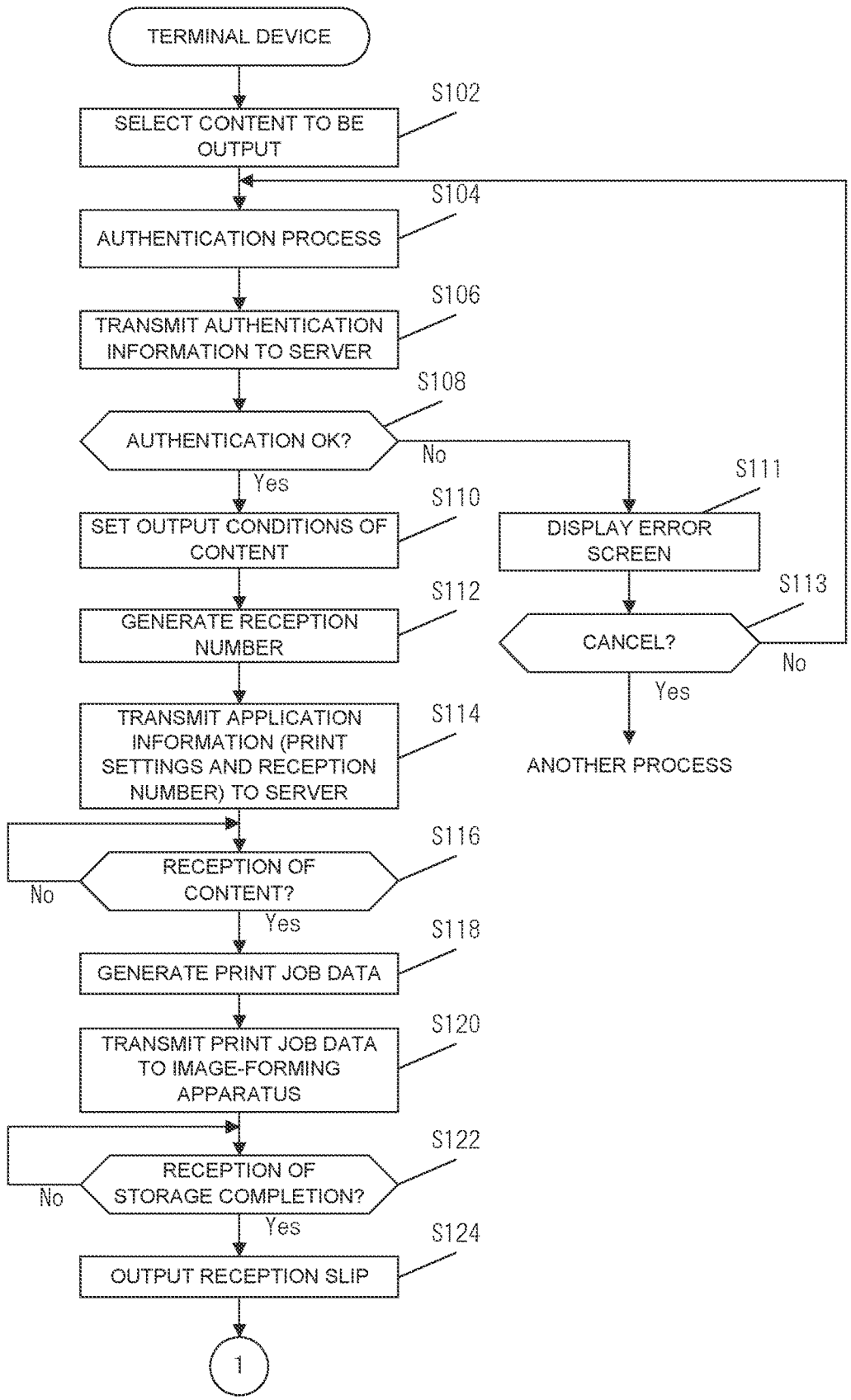
FIG. 9 is a flowchart of a process (of the terminal device) according to the first embodiment.
Figure 10:
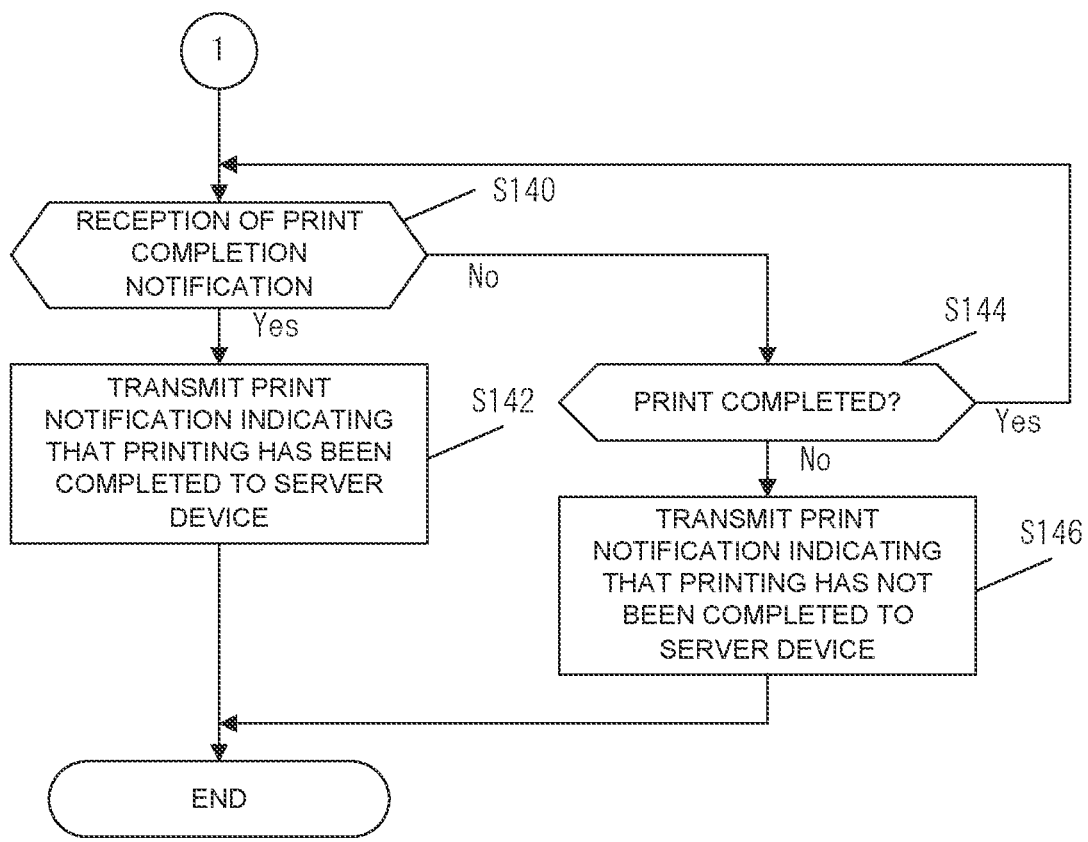
FIG. 10 is the flowchart of the process (of the terminal device) according to the first embodiment.

FIGS. 9 and 10 are a flowchart of processing performed by the terminal device 10. The controller 100 selects content to be output by an operation input performed by the user (step S102).

Subsequently, the controller 100 executes an authentication process (step S104). The authentication process is performed by the personal authenticator 104. The controller 100 performs verification of personal authentication using the server device 30 based on an electronic certificate obtained from the My Number Card, for example, through the authentication process.

Furthermore, the controller 100 may identify the server device 30 from which the certificate is to be obtained through the authentication process. For example, the controller 100 identifies a municipality from which the user can obtain a certificate from an electronic certificate stored in the My Number Card. The controller 100 then identifies the server device 30 in the municipality. Note that the municipality may be identified based on the electronic certificate received by the server device 30. Furthermore, the controller 100 may allow the user to select a destination from which the certificate is to be obtained.

When the authentication fails, the controller 100 displays an error screen (step S108; No→step S111). For example, the controller 100 executes a process of displaying a verification-failure result notification screen for a certain period of time when a verification-failure result is received in a personal authentication by the server device 30.

Here, when a cancel operation is performed by the user (step S113; Yes), the controller 100 executes another process. Furthermore, when the user does not perform the cancel operation, the controller 100 repeatedly performs the process in step S104 onwards (step S113; No→step S104).

When the authentication is appropriately performed (e.g., when the server device 30 has not received a verification failure in the personal authentication verification), the controller 100 sets content output conditions (step S110). For example, when the number of copies of a certificate to be output as content is set by the user, the controller 100 sets the number of copies as an output condition (a print setting).

The controller 100 generates a reception number (step S112). The reception number is a type of PIN number and is used to identify the content (or a print job) to be output. The controller 100 transmits application information to the server device 30 (step S114). The application information may include one or more of the following, for example: information indicating the content (a type of certificate), the set output conditions (the print settings), and the generated reception number.

When receiving the content from the server device 30 (step S116; Yes), the terminal device 10 generates print job data (step S118). Note that, when the controller 100 simply receives the content (e.g., certificate image data) from the server device 30, the controller 100 generates print job data based on the application information. At this time, the controller 100 is not required to transmit unrequired information to the server device 30 among the plurality of types of information, such as the print settings and the reception number.

The controller 100 transmits the print job data to the image-forming apparatus 20 (step S120). When receiving information indicating that the print job data has been stored from the image-forming apparatus 20 (step S122; Yes), the controller 100 outputs a reception slip (step S124).

Note that, in step S122, the controller 100 waits until a storage completion notification of the print job data is received from the image-forming apparatus 20. However, when the notification is not received for a predetermined period of time or a predetermined number of times, the process may be aborted as a time-out.

Furthermore, the controller 100 may output a reception slip based on identification information included in the print completion notification. For example, the controller 100 may output a reception slip based on the reception number included in the print completion notification.

Subsequently, when receiving the print completion notification from the image-forming apparatus 20 (step S140; Yes), the controller 100 transmits a print notification indicating the print completion to the server device 30 (step S142). Furthermore, when the printing has not been completed by the image-forming apparatus 20 (step S144; No), the controller 100 transmits a print notification indicating that the printing has not been completed to the server device 30 (step S146).

Here, the controller 100 may determine that printing of the content (the certificate) has not been completed by the image-forming apparatus 20 based on a notification indicating that the printing has not been performed supplied from the image-forming apparatus 20. Furthermore, when the controller 100 has not received the print completion notification from the image-forming apparatus 20 after a predetermined period of time has elapsed, the controller 100 may determine that printing has not been performed. For example, when the printing has not been performed after a predetermined period of time, such as 1 hour, 3 hours, or 24 hours, has elapsed since the print job was submitted, or after business hours have elapsed, the controller 100 determines that the printing has not been completed.

1.4.3 Processing of Server Device

Figure 11:
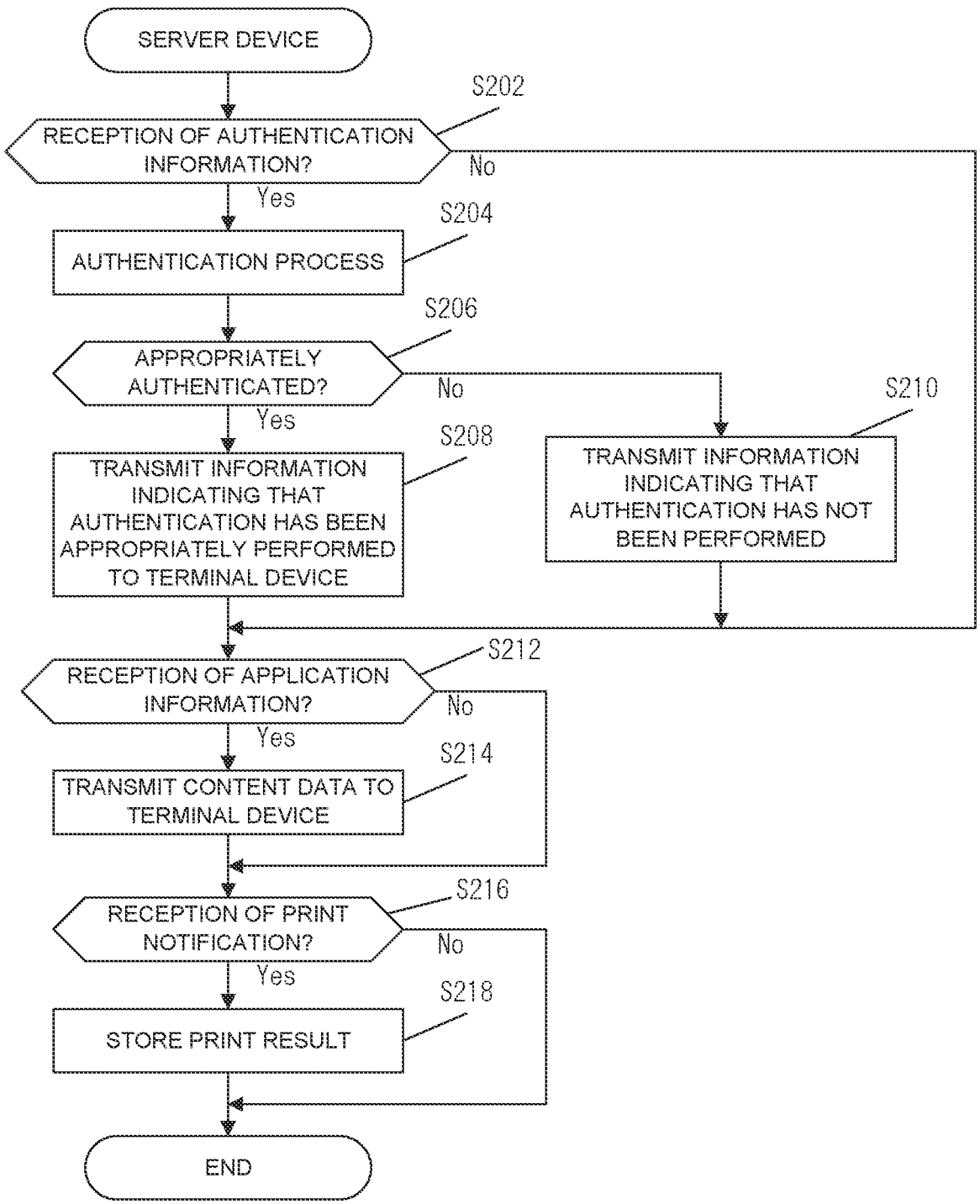
FIG. 11 is a flowchart of a process (of the server device) according to the first embodiment.

FIG. 11 is a flowchart of processing performed by the server device 30. The controller 300 receives authentication information (step S202) and executes an authentication process (step S204). Specifically, authentication is performed by the personal authenticator 304.

When the controller 300 can appropriately perform the authentication, the controller 300 transmits information indicating that the authentication has been appropriately performed to the terminal device 10 (step S206; Yes→step S208). Furthermore, when the authentication has not been appropriately performed, the controller 300 transmits information indicating that the authentication has not been appropriately performed to the terminal device 10 (step S206; No→step S210).

For example, the controller 300 may check personal authentication and performs authentication in accordance with a result of verification. The controller 300 may transmit to the terminal device 10 a verification result indicating successful verification or a verification result indicating failure.

When receiving the application information from the terminal device 10 (step S212; Yes), the controller 300 transmits content (a certificate) based on the application information to the terminal device 10 (step S214). For example, the controller 300 generates image data for content based on a certificate selected by the user. Here, the controller 300 may transmit not only content data but also data based on the application information to the terminal device 10. For example, a reception number included in the application information may also be transmitted.

When receiving a print notification from the terminal device 10 (step S216; Yes), the controller 300 stores a print result (step S218). By this, the controller 300 can provide statistical information, such as whether the content (the certificate) has actually been delivered.

1.4.4 Processing of Image-Forming Apparatus

Figure 12:
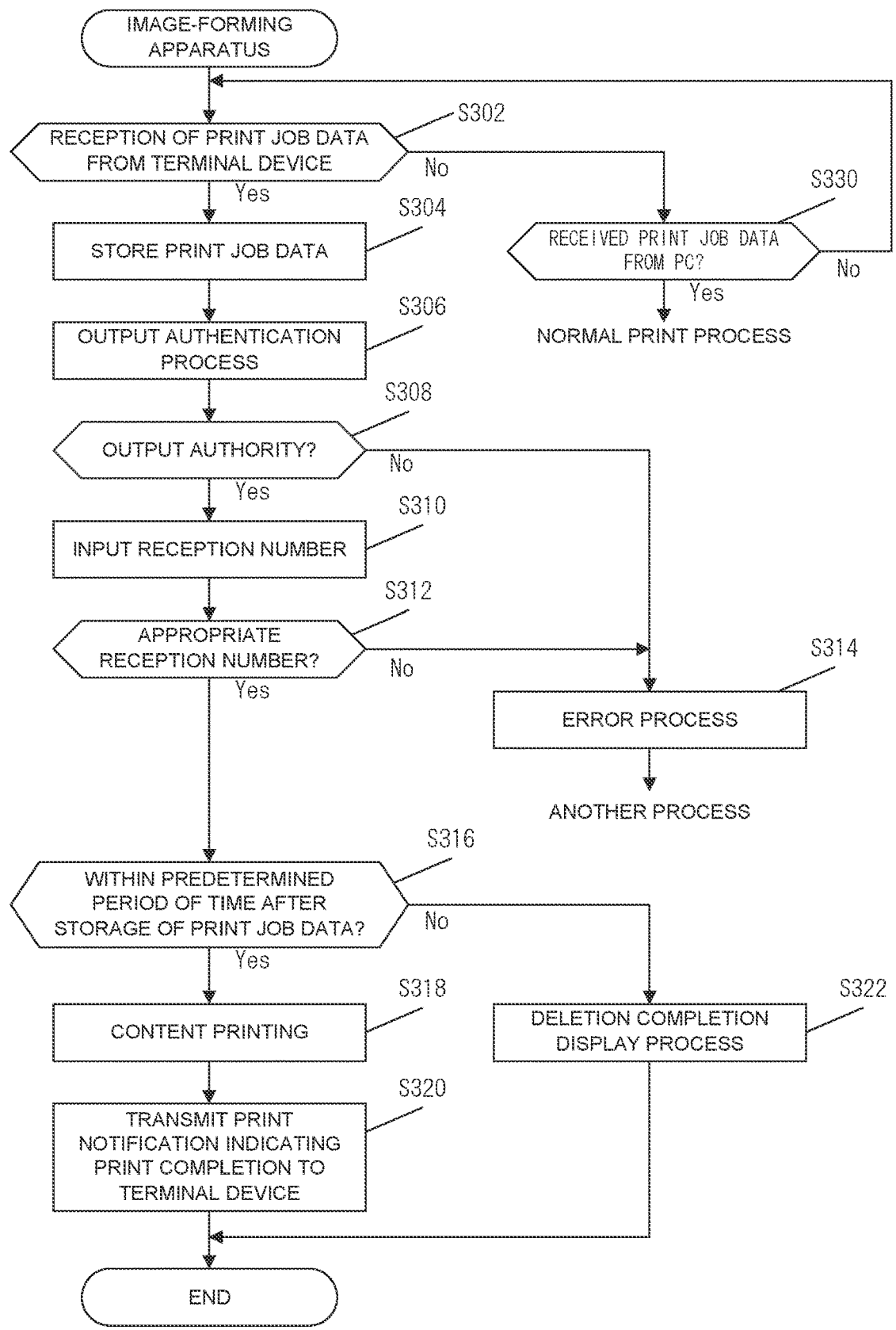
FIG. 12 is a flowchart of a process (of the image-forming apparatus) according to the first embodiment.

FIG. 12 is a diagram illustrating processing performed by the image-forming apparatus 20. When receiving print job data from the terminal device 10 (step S302; Yes), the controller 200 stores the print job data (step S304). Note that, when receiving print job data from another device, for example, the PC 40, the controller 200 executes a normal print process (step S302; No→step S330; Yes).

The controller 200 executes an output authentication process (step S306). When the output person has an output authority (step S308; Yes), the controller 200 accepts an input of the reception number (step S310). When the input reception number is appropriate, the controller 200 determines whether it is within a predetermined period of time since the print job data was stored (step S312; Yes→step S316).

The controller 200 first determines whether it is within the predetermined period of time since the print job data was stored (step S316). For the purpose of ensuring security, the controller 200 does not execute a print job after the predetermined time has elapsed. Therefore, when the predetermined period of time has elapsed since the print job data was stored, the controller 200 executes a deletion completion display process and does not output the content (step S322). Note that the controller 200 may automatically delete the print job data that has been stored for the predetermined period of time or more. Furthermore, although the print job data has not been deleted at this timing, the controller 200 may suppress execution of the print job data.

When it is within the predetermined period of time (step S316; Yes), the controller 200 executes the print job and prints the content (step S318). When the printing of the content is completed, the controller 200 transmits a print notification indicating the print completion to the terminal device 10 (step S320).

Here, the controller 200 executes an error process when it is determined that the output person does not have the output authority as a result of the output authentication process in step S308 (step S308; No→step S314). The controller 200 may indicate on the display that output may not be performed or prompt the user to perform authentication again as the error process.

Furthermore, the controller 200 executes the error process when it is determined that the reception number is inappropriate in step S312 (step S312; No→step S314). Here, the inappropriate reception number means, for example, that the print job data including the reception number is not stored. Furthermore, the inappropriate reception number means that, when the output person identifies a print job, a reception number included in print job data for the print job does not match a reception number entered by the output person.

1.5 Operation Example

An operation example will be described using examples of display screens. The display screens shown in FIGS. 13A to 17 are displayed on the display 140 of the terminal device 10 as examples.

Figure 13A:
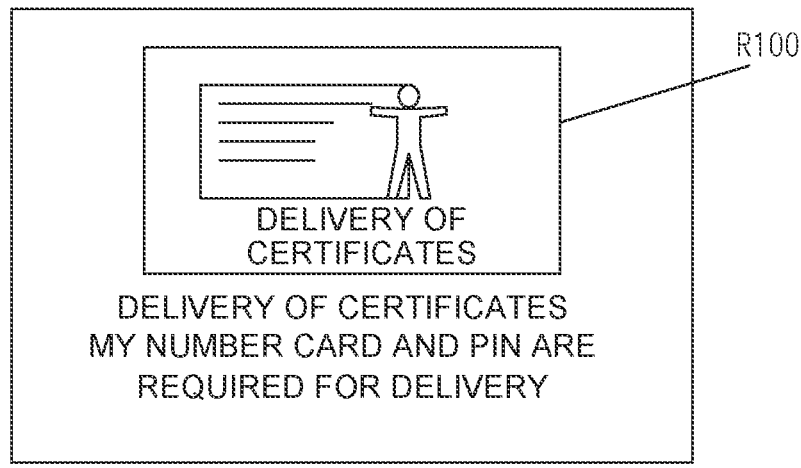
FIG. 13A is a diagram illustrating an example of a display screen of the terminal device according to the first embodiment.
Figure 13B:
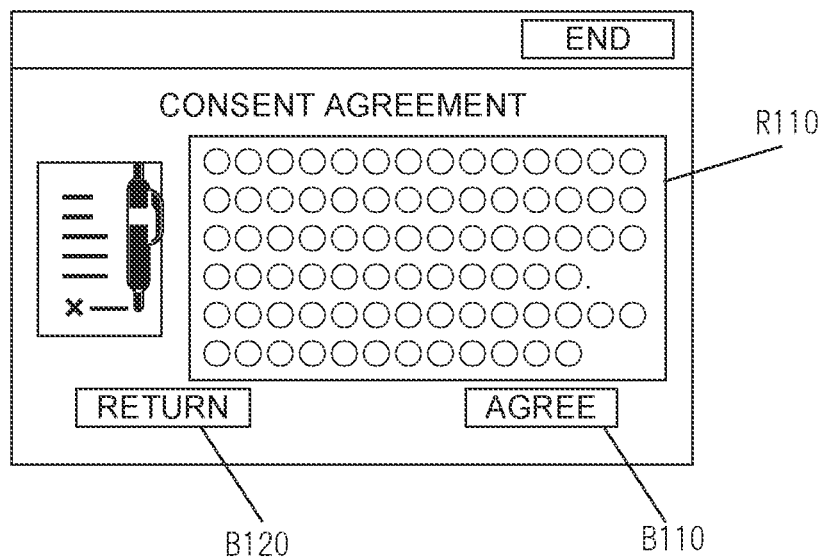
FIG. 13B is a diagram illustrating an example of a display screen of the terminal device according to the first embodiment.

For example, as shown in FIG. 13A, a function selection screen is displayed on the display screen. In a region R100 of the display screen, text "Delivery of Certificates" is displayed. When the user selects the text "Deliver Certificates", a service to deliver a certificate is started. At this time, for example, as illustrated in FIG. 13B, an item as a notification for the user, such as consent agreement or precautions may be displayed on the display screen.

Figure 14A:
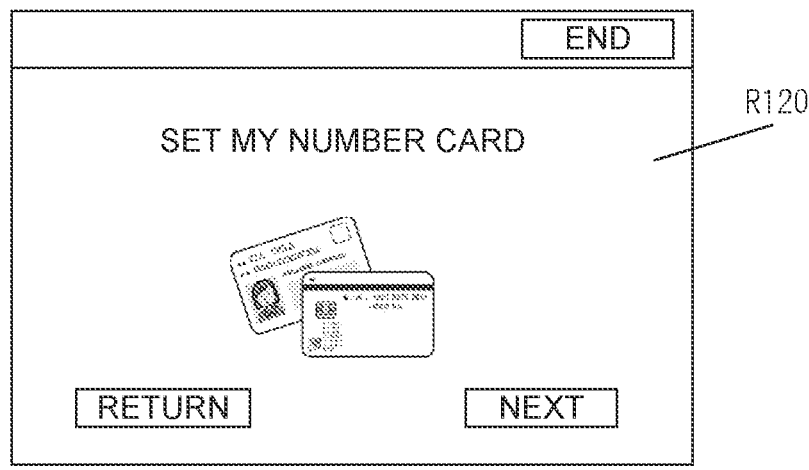
FIG. 14A is a diagram illustrating an example of a display screen of the terminal device according to the first embodiment.

Subsequently, the terminal device 10 displays a guidance screen on the display screen asking the user to set the My Number Card (e.g., FIG. 14A). In the display screen shown in FIG. 14A, a message "Please set My Number Card" is displayed in a region R120.

When the user sets the My Number Card on a card reader, the terminal device 10 prompts the user to select a certificate.

Figure 14B:
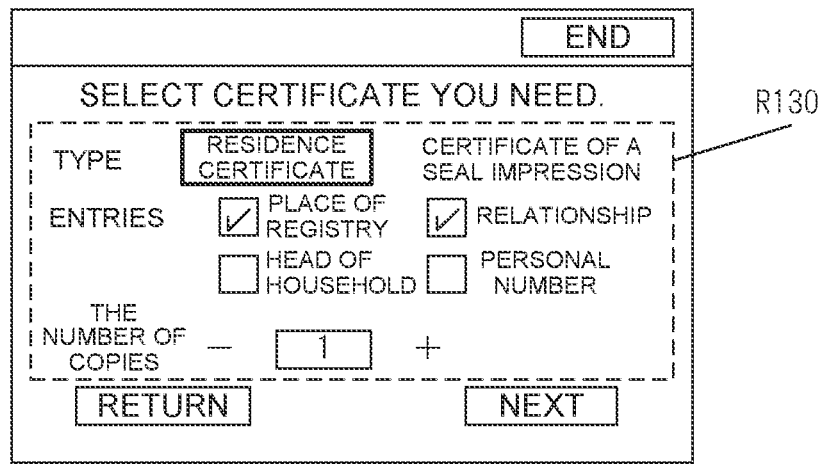
FIG. 14B is a diagram illustrating an example of a display screen of the terminal device according to the first embodiment.

For example, as shown in a region R130 of the display screen in FIG. 14B, the user can select a type of certificate and a description to be included in the certificate as content. The user may also select the number of copies of the certificate to be delivered as required.

For the document selected by the user, the terminal device 10 displays confirmation of the content on the display screen. For example, in a region R140 of the display screen in FIG. 15A, the type of certificate, the items to be included in the certificate, and the number of copies are displayed.

Furthermore, the user inputs a PIN at a certain timing. A region R150 of the display screen in FIG. 15B may accept an input of a PIN. For example, FIG. 15B is a diagram illustrating the display screen that accepts an input of a PIN for an electronic certificate for user certificate.

Figure 16A:
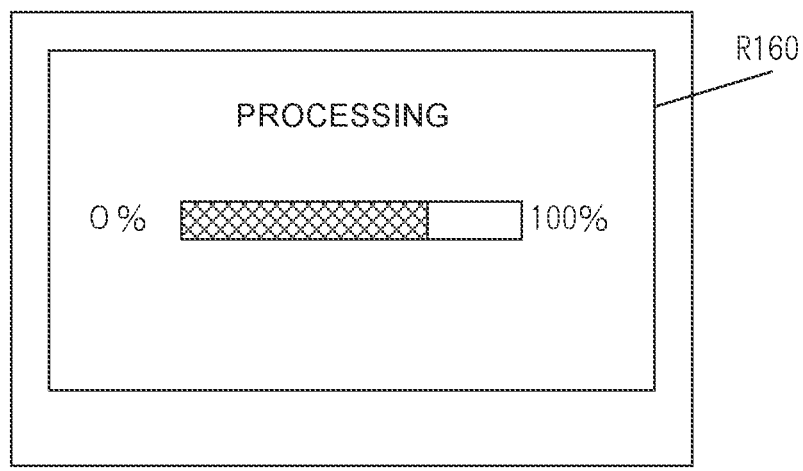
FIG. 16A is a diagram illustrating an example of a display screen of the terminal device according to the first embodiment.

The terminal device 10 transmits the application information to the server device 30 and receives the content (the certificate). While the terminal device 10 is executing the process, a display screen showing progress of the process, for example, may be displayed as shown in FIG. 16A. In a region R160 of the display screen in FIG. 16A, a progress bar is displayed to indicate the progress of the process.

The terminal device 10 then displays a final application screen for the user. In a display screen in FIG. 16B, the type and the number of copies of the certificate to be output are displayed in a region R170. Furthermore, in the region R170 of the display screen, an amount of certificate issuance fee is displayed.

Figure 16B:
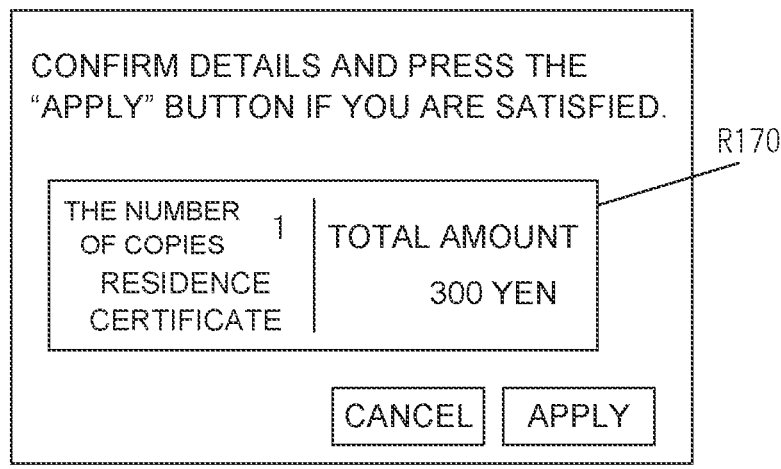
FIG. 16B is a diagram illustrating an example of a display screen of the terminal device according to the first embodiment.
Figure 17:
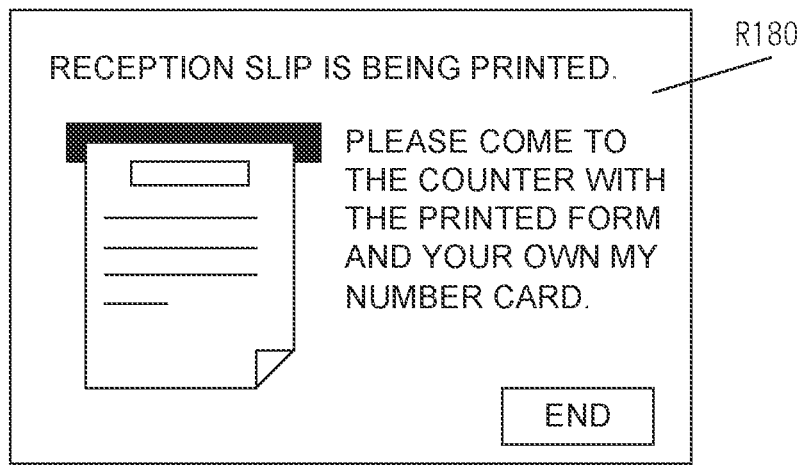
FIG. 17 is a diagram illustrating an example of a display screen of the terminal device according to the first embodiment.

When the user selects "Apply" in FIG. 16B, the terminal device 10 submits a print job based on the content to the image-forming apparatus 20. Specifically, the terminal device 10 transmits print job data including the content (certificate image data) to the image-forming apparatus 20. Then, the image-forming apparatus 20 stores the print job data and notifies the terminal device 10 of completion of the storage. When receiving the notification indicating that the print job data has been stored from the image-forming apparatus 20, the terminal device 10 outputs a reception slip.

At this time, the terminal device 10 may indicate on the display screen that the reception slip is being output. For example, the display screen in FIG. 17 indicates that the reception slip is being printed in a region R180.

FIG. 18 is a diagram illustrating an example of a reception slip output from the terminal device 10. For example, a reception number and required items are shown in the reception slip. For example, the reception slip may include an amount of fee, the number of copies to be delivered, a date of delivery, and a sequential number (an inquiry number) for the delivery of the certificate.

Furthermore, the terminal device 10 may additionally print a bar code or other identification code representing the reception number on the reception slip.

The user receives the reception slip output from the terminal device 10 and submits the reception slip to the output person (e.g., a staff member) at a counter where the certificate is to be issued.

The output person logs into the image-forming apparatus 20 as a user for certificate delivery. For example, the output person uses a card recording information on the user for the certificate issuance to log into the image-forming apparatus 20 by card authentication. The output person then performs switching to a mode of issuance of the certificate in the image-forming apparatus 20.

Figure 19A:
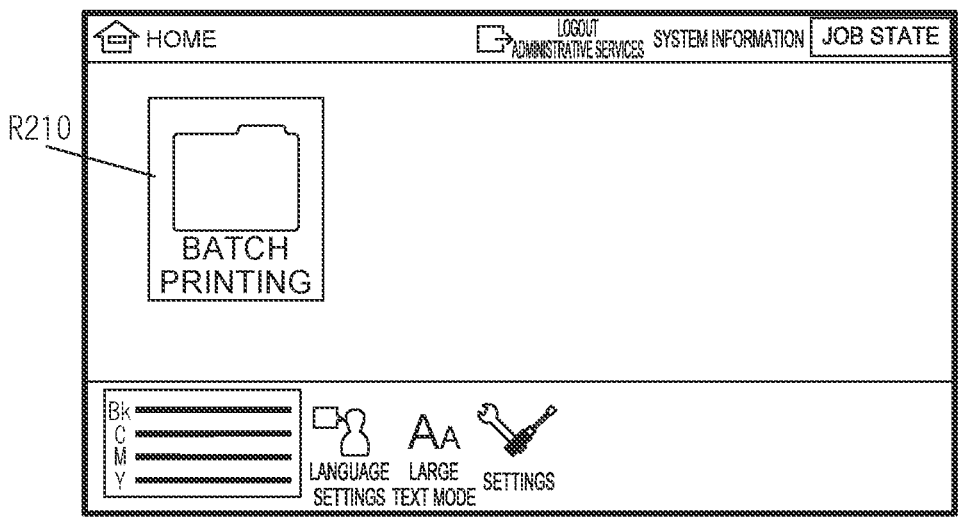
FIG. 19A is a diagram illustrating an example of a display screen of the image-forming apparatus according to the first embodiment.

For example, FIG. 19A is an example of a screen displayed after a user to whom administrative services can be provided (the user for certificate issuance) performs login. For example, in a display screen in FIG. 19A, a "Batch Printing" button is displayed in a region R210 as a function of issuing a certificate.

Figure 19B:
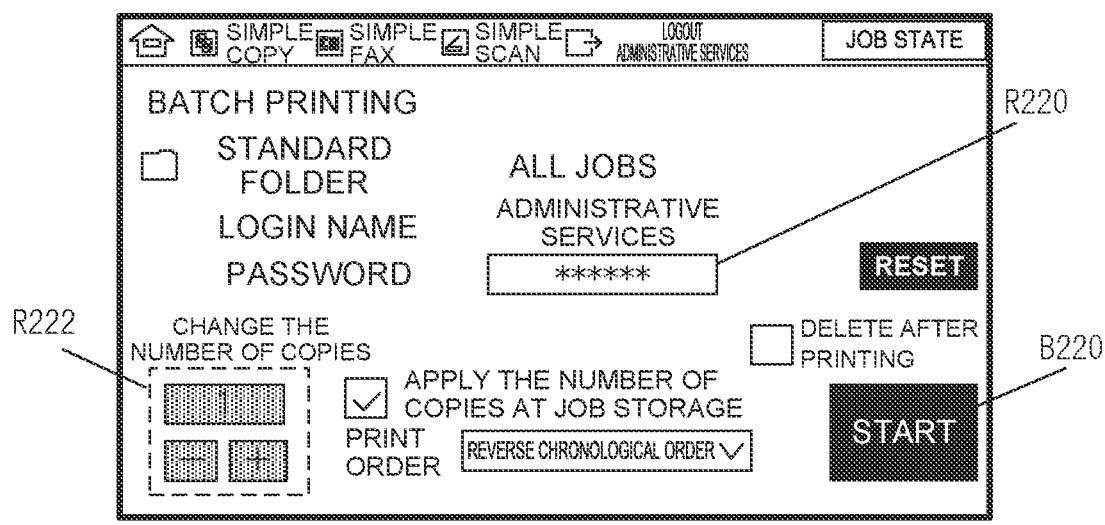
FIG. 19B is a diagram illustrating an example of a display screen of the image-forming apparatus according to the first embodiment.

When batch printing is selected, the image-forming apparatus 20 performs switching to a display screen shown in FIG. 19B. A region R220 in FIG. 19B has an input field for entering a reception number. The output person may print a certificate by entering a reception number in the region R220.

Note that the number of copies may be set in a region R222. The region R222 is grayed out in FIG. 19B and may not be changed by the output person. Accordingly, the output person may avoid output of a number of certificates larger than the number of copies set by the user, contrary to the user's intention.

It is preferable for the output person to verify the identity of a person to whom the certificate is to be issued by means of the user's My Number Card, etc., who desires to receive the certificate. It is further preferable that the output person checks the certificate for printing defects.

It is also preferable the output person receives a fee for the certificate from the user. In this case, an amount of fee to be collected by the output person is printed on the reception slip. The output person delivers the certificate to the user in exchange for the fee. Note that the output person may also generate a receipt in conjunction with the output of the certificate.

1.6 Application Examples

The system of this embodiment applied to administrative services has been described as an example.

Specifically, the user uses the My Number Card as a method of personal authentication, and a certificate issued by a local government is content as an example in the description above. However, the system described above is available for other systems.

For example, the server device may be a seat reservation system managed by an airline or a railroad operator. In this case, the user uses the terminal device 10 to enter required seating information (e.g., a flight to be used, a seat type, a location, etc.). The terminal device 10 transmits the seating information to the server device 30 which provides a service of managing seat reservations.

When a seat reservation is securely performed, the server device 30 transmits image data of a ticket or an airline ticket to the terminal device 10 as content. The terminal device 10 generates print job data based on the image data of the ticket or the airline ticket and transmits the print job data to the image-forming apparatus 20. The image-forming apparatus 20 prints the ticket or the airline ticket through an operation performed by an output person.

Thus, the system according to this embodiment is also applicable in the seat reservation systems, etc. Note that, in addition to the seat reservation systems, the system of this embodiment is applicable to, movie theater reservation systems and hotel room reservation systems.

Note that the system may provide mere content by a user operation. For example, newspapers, pictures, or photos may be provided as content.

1.7 Advantageous Effects

As described above, according to this embodiment, when the terminal device 10 and the image-forming apparatus 20 are used in combination, content may be efficiently acquired and output. The efficient acquirement of content is enabled since an operation input is performed by the terminal device 10 to acquire content, even when a plurality of terminal devices 10 are used, the terminal devices 10 can individually acquire content in parallel.

Furthermore, a dedicated apparatus is not required as the image-forming apparatus 20 for printing content, and content may be output using an image-forming apparatus that are normally used. This is because the acquired content is transmitted from the terminal device 10 to the image-forming apparatus 20 as single job data, including print settings, an output location (e.g., a location of the image-forming apparatus 20 that performs output, or a location of the paper discharge tray of the image-forming apparatus 20), and a reception number (a PIN code) for output.

Furthermore, even when a secure line is to be ensured with the server device 30, by separating the terminal device 10 from the image-forming apparatus 20, content may be output while the image-forming apparatus 20 is used in the same way as before.

2. Second Embodiment

A second embodiment will be described. In the first embodiment, the server device 30 and the image-forming apparatus 20 may not directly communicate with each other, and therefore, communication is performed via the terminal device 10.

In this embodiment, a case where a secure communication path is ensured between an image-forming apparatus 20 and a server device 30 will be described.

Note that only points that are different from the first embodiment are described in the present embodiment, and descriptions are omitted for points that are the same in functional configuration and processing.

FIG. 20 is a diagram obtained by modifying FIG. 8 of the first embodiment. First, a user performs an issuance operation using a terminal device 10 (S2000). The terminal device 10, for example, directly makes a content request to the image-forming apparatus 20 (S2002).

The terminal device 10 transmits a content request to the server device 30 (S2004). The server device 30 selects content corresponding to the content request and transmits the content to the image-forming apparatus 20 as a content response (S2006).

The image-forming apparatus 20 generates print job data based on the content request received from the terminal device 10 and the content received from the server device 30 and stores the generated print job data. After storing the print job data, the image-forming apparatus 20 transmits a notification indicating that the print job has been stored to the terminal device 10 (S2008).

When receiving the notification indicating that the print job has been stored, the terminal device 10 prints a reception slip (S2010). A user submits the reception slip to an output person (S2012). The output person issues a print instruction to the image-forming apparatus 20 using a reception number included in the reception slip (S2014). The image-forming apparatus 20 prints content (S2016). Furthermore, the image-forming apparatus 20 notifies the server device 30 of completion of the printing (S2018).

The user pays a fee to the output person (S2020). After receiving the fee and verifying identity of the user, the output person delivers a printed material to the user (S2022).

Thus, according to this embodiment, the image-forming apparatus 20 can play a central role in acquiring content from the server device 30 and printing the content. Therefore, the terminal device 10 may be a simpler device, for example.

3. Third Embodiment

A third embodiment will be described. In this embodiment, print job data is deleted after a predetermined period of time. Note that only points that are different from the first embodiment are described in this embodiment, and descriptions are omitted for points that are the same in functional configuration and processing.

FIG. 21 is a flowchart of a process of deleting print job data performed by an image-forming apparatus 20. The process in FIG. 21, for example, is a process that is periodically executed by a controller 200.

The controller 200 deletes print job data when a specified time point is reached (step S402 to step S406) or when a predetermined period of time has passed since the print job data was stored (step S408 and step S410).

The controller 200 first determines whether the specified time point has arrived (step S402). Here, the specified time point is set by an output person or an administrator. For example, when a counter is open from 9:00 a.m. to 5:00 p.m., a time point at which business ends, such as 5:00 p.m. or 5:30 p.m., is determined as the specified time point.

When print job data that has not been output exists at the specified time point (step S404; Yes), the controller 200 deletes stored print job data (step S406).

Accordingly, a user recognizes that a certificate is valid only on the day when an application for issuance of the certificate is made. Specifically, since print job data is deleted without being carried over to the next day, a system 1 can ensure security.

Furthermore, when the predetermined period of time has elapsed since the print job data was stored, the controller 200 deletes the print job data (step S408; Yes→step S410). When "3 hours" is set as the predetermined period of time, for example, print job data that was not output after 3 hours is deleted.

Note that, before this embodiment is provided, it is preferable that the policy for deletion is noted on the reception slip. For example, messages "The certificate is valid only on the day of application" and "Please come to the counter within 3 hours to receive your certificate. If it takes more than 3 hours, you must reapply for the certificate" are preferably described on the reception slip.

4. Fourth Embodiment

A fourth embodiment will be described. In this embodiment, a portable terminal device 12 is used instead of the terminal device 10. Note that only points that are different from the first embodiment are described in this embodiment, and descriptions are omitted for points that are the same in functional configuration and processing.

Figure 22:
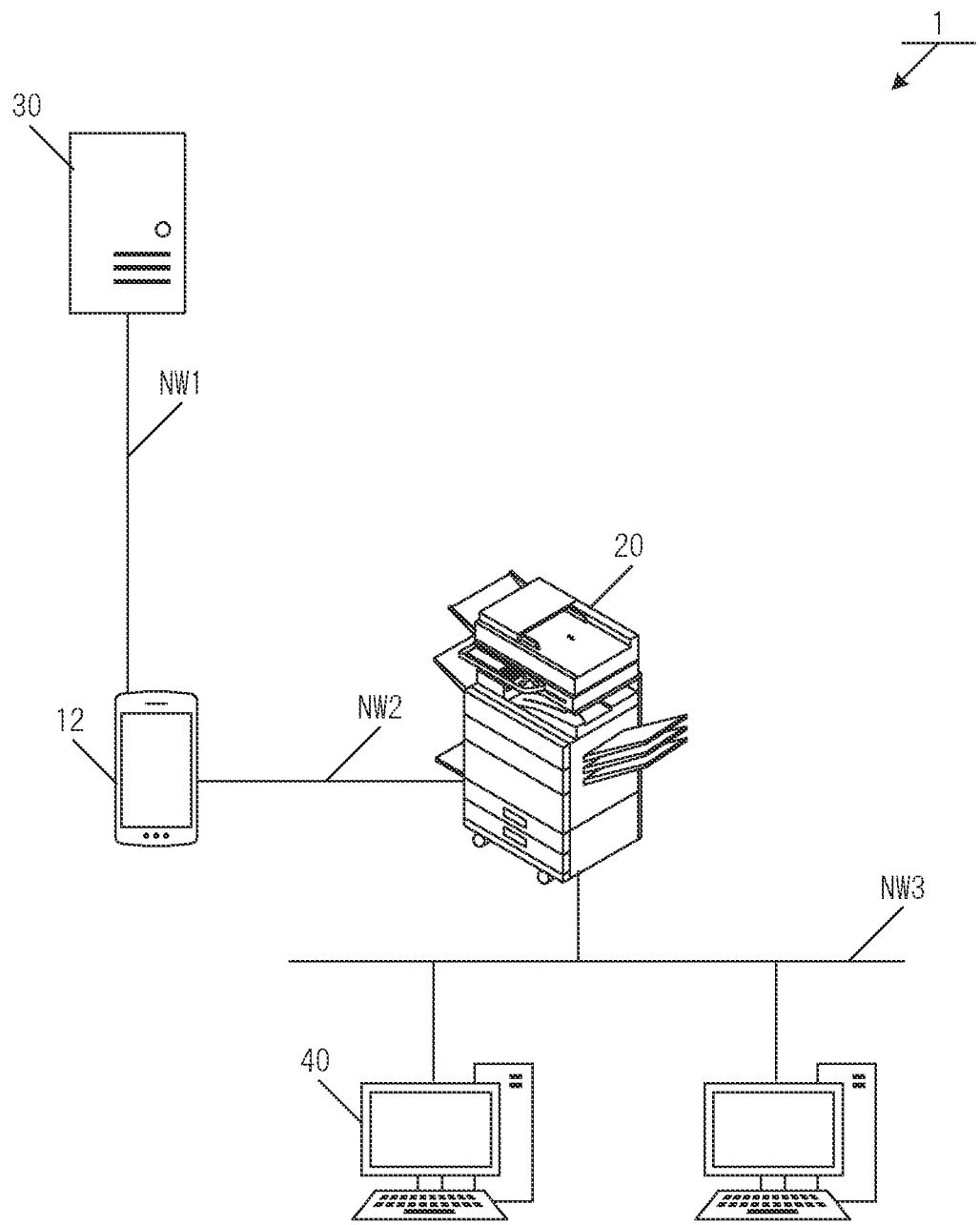
FIG. 22 is a diagram illustrating an outline of a system according to a fourth embodiment.

FIG. 22 is a diagram obtained by modifying FIG. 1 of the first embodiment. Specifically, an application with functions equivalent to those provided by the terminal device 10 is installed in a smartphone, a tablet, or other devices of a user. When the user uses own portable terminal device 12, the same functions as in the embodiment described above may be realized.

Furthermore, in this case, a reception slip may be displayed on a display screen of the portable terminal device 12.

Furthermore, it is preferable that a secure communication path can be established between the portable terminal device 12 and the server device 30. In this case, it is sufficient to establish a secure communication path, for example, with an application that can provide a VPN functional. Furthermore, an access point with a relay function may be provided between the server device 30 and the portable terminal device 12. In this case, the server device 30 and the access point is connected by a secure communication path (e.g., a dedicated line).

5. Modification

The present disclosure is not limited to any of the embodiments described above, and various modifications may be made.

In other words, an embodiment that is obtained by combining technical means appropriately changed without departing from the gist of the present disclosure falls within a technical scope of the present disclosure.

Furthermore, although each embodiment is described separately for convenience of explanation in the above-mentioned embodiments, they can be executed in combination within a possible range. Furthermore, the applicant intends to acquire rights to any of the technologies described in the specification through amendments, divisional applications, or the like.

Furthermore, programs that run on each device in each embodiment control the CPU and the like (programs that cause a computer to function) so as to achieve the functions of the above-mentioned embodiments. Moreover, information handled by these devices is temporarily stored in a temporary storage device (for example, a RAM) when being processed, and then stored in various storage devices, such as a ROM and an HDD, where the information is read, corrected, and written by the CPU as needed.

Here, a recording medium for storing the program may be any of a semiconductor medium (e.g., a ROM, a non-volatile memory card, etc.), an optical recording medium/magneto-optical recording medium (e.g., a Digital Versatile Disc (DVD), a CD, a BD (registered trademark), etc.), a magnetic recording medium (e.g., a magnetic tape, a flexible disc, etc.), and the like.

Furthermore, in a case where the programs are to be distributed to the market, the programs may be stored in a portable recording medium for distribution or transferred to a server computer connected via a network, such as the Internet. In this case, of course, a storage device in the server device is also included in the present disclosure.

Furthermore, the data described above may not be stored in the device, but may be stored in an external device and called as appropriate. For example, the data may be stored in a network attached storage (NAS) or on the cloud.

Note that the scope of the present disclosure is not limited to the configurations explicitly described in the specification but includes any combination of the technologies disclosed in the present specification. In the present disclosure, the configurations to be patented are described in the appended claims. However, it is not intended to exclude configurations from the technical scope on the grounds that the configurations are not described in the claims.

In addition, the descriptions "in a/the case of/where" and "when" in the specification are explained as examples, and the configuration is not limited to the described contents. Configurations other than the cases described with "in a/the case of/where" and "when" are also disclosed to the extent that would be obvious to a person skilled in the art, and it is intended to acquire the right to such configurations.

Furthermore, the order of processing and the data flow described in the specification is not limited to the order in which they are described. For example, a configuration in which a part of processing is removed, or the order thereof is switched is also disclosed, and it is intended to acquire the right to such a configuration.

The functions described in the embodiments are described as being performed by the corresponding devices, but they may be realized by a single device or even by using an external server.

Each functional block or various features of the device used according to the embodiments described above may be implemented or executed in an electrical circuit, e.g., an integrated circuit or a plurality of integrated circuits. The electrical circuit designed to perform the functions described herein may include general-purpose processors, digital signal processors (DSP), application-specific integrated circuits (ASIC), field programmable gate arrays (FPGA), or other programmable logic devices, discrete gate or transistor logic, discrete hardware components, or a combination of these. A general-purpose processor may be a microprocessor or a conventional processor, controller, microcontroller, or state machine. The electrical circuit described above may include a digital circuit or an analog circuit. When an integrated circuit technology that replaces the current integrated circuits emerges as a result of advances in semiconductor technology, one or more aspects of the present disclosure may also use new integrated circuits based on such technology.

What is claimed is:

1. An output system including a terminal device having a first controller, a first communicator, and a first outputter, an image-forming apparatus having a second controller, a second communicator, and a second outputter, and a server device, wherein
the first controller of the terminal device
acquires content from the server device through the first communicator,
generates job data including a setting for outputting the content based on the acquired content,
transmits the job data to the image-forming apparatus through the first communicator, and
outputs a reception slip including a reception number corresponding to the generated job data from the first outputter, and
the second controller of the image-forming apparatus
receives the job data from the terminal device through the second communicator, and
outputs the content from the second outputter after executing a job based on the job data corresponding to the reception number when the reception number is input.

2. The output system according to claim 1, wherein
the first controller of the terminal device
receives a type of the content to be acquired from the server device,
authenticates a first user, and
acquires the content corresponding to the received type from the server device through the first communicator when the first user is authenticated.

3. The output system according to claim 2, wherein
the content relates to a certificate to be delivered, and
the first controller of the terminal device acquires a certificate of the authenticated first user as the content from the server device through the first communicator.

4. The output system according to claim 1, wherein the second controller of the image-forming apparatus executes a job based on the job data when accepting authentication of a second user.

5. The output system according to claim 1, wherein
the second controller of the image-forming apparatus transmits a notification indicating that output of the content from the outputter is completed to the terminal device through the second communicator, and
the first controller of the terminal device notifies, when receiving the notification from the image-forming apparatus through the first communicator, the server device of the notification indicating that the output of the content is completed to the server device through the first communicator.

6. The output system according to claim 1, wherein, when a setting for output of the content is included in the job data, the second controller of the image-forming apparatus does not change the setting.

7. The output system according to claim 6, wherein the setting relates to the number of copies of content to be output.

8. The output system according to claim 1, wherein
the image-forming apparatus further includes a storage that temporarily stores the job data after receiving the job data, and
the second controller executes the job based on the job data stored in the storage and outputs the content from the second outputter after receiving an output instruction issued by the second user.

9. The output system according to claim 8, wherein
the second controller of the image-forming apparatus notifies the terminal device that the job data is stored in the storage through the second communicator, and
the first controller of the terminal device outputs the reception slip from the outputter after receiving the notification indicating that the job data is stored in the storage.

10. The output system according to claim 8, wherein the first controller of the image-forming apparatus deletes the job data when a predetermined period of time elapses after the job data is stored in the storage.

11. The output system according to claim 1, wherein the first communicator of the terminal device establishes a first communication path for communication with other devices, and establishes a secure second communication path for communication with the server device.

12. A terminal device including a communicator for communication with an image-forming apparatus and a server device, and a controller, wherein the controller acquires content from the server device through a secure first communication path, generates job data including a setting for outputting the content based on the acquired content, transmits the job data to the image-forming apparatus through a second communication path that is different from the first communication path, and generates a reception number that corresponds to the job data and that is to be used when the image-forming apparatus outputs the content, and outputs a reception slip including the reception number.

* * * * *